(12) United States Patent
Kadokawa

(10) Patent No.: US 9,017,193 B2
(45) Date of Patent: Apr. 28, 2015

(54) BELT-TYPE CONTINUOUSLY VARIABLE TRANSMISSION FOR VEHICLE

(75) Inventor: Masanori Kadokawa, Toyota (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

(21) Appl. No.: 13/822,655

(22) PCT Filed: Sep. 15, 2010

(86) PCT No.: PCT/JP2010/065960
§ 371 (c)(1),
(2), (4) Date: Mar. 13, 2013

(87) PCT Pub. No.: WO2012/035624
PCT Pub. Date: Mar. 22, 2012

(65) Prior Publication Data
US 2013/0178316 A1   Jul. 11, 2013

(51) Int. Cl.
*F16H 55/56* (2006.01)
*F16H 59/00* (2006.01)
(Continued)

(52) U.S. Cl.
CPC .................. *F16H 9/18* (2013.01); *F16H 55/56* (2013.01); *F16H 57/035* (2013.01)

(58) Field of Classification Search
CPC ........... F16H 55/56; F16H 9/18; F16H 9/125; F16H 61/66272; F16H 9/24
USPC ...................................................... 474/8, 28
See application file for complete search history.

(56) References Cited

U.S. PATENT DOCUMENTS 2,887,893 A * 5/1959 Claas ............................... 474/28
2,916,927 A * 12/1959 Opper ............................. 474/28
(Continued)

FOREIGN PATENT DOCUMENTS

| JP | 2002-147554 | 5/2002 |
| JP | 2008-208861 | 9/2008 |

(Continued)

*Primary Examiner* — Henry Liu
(74) *Attorney, Agent, or Firm* — Finnegan, Henderson, Farabow, Garrett & Dunner, LLP

(57) ABSTRACT

A belt-type continuously variable transmission for a vehicle includes: a primary pulley including a first fixed sheave fixed to an input shaft, and a first movable sheave relatively non-rotatable and relatively movable in axial direction to the input shaft due to spline-fitting of a female spline formed on an inner circumferential portion thereof to a male spline formed on the input shaft; a secondary pulley including a second fixed sheave fixed to an output shaft in parallel with the input shaft, and a second movable sheave relatively non-rotatable and relatively movable in the axial direction to the output shaft due to spline-fitting of a female spline formed on an inner circumferential portion thereof to a male spline formed on the output shaft; and a transmission belt, the belt-type continuously variable transmission for a vehicle disposed with at least one of a first groove width defining portion disposed on the primary pulley for defining a maximum groove width of the first pulley groove and a second groove width defining portion disposed on the secondary pulley for defining a maximum groove width of the second pulley groove, the first groove width defining portion and the second groove width defining portion being disposed on one shaft of the input shaft and the output shaft, and the other shaft having a uniform shaft diameter in an range of sliding of the first movable sheave or the second movable sheave in the axial direction except a site with the male spline formed, the other shaft being disposed on the opposite side to the one shaft.

12 Claims, 13 Drawing Sheets

(51) Int. Cl.
   *F16H 61/00* (2006.01)
   *F16H 63/00* (2006.01)
   *F16H 9/18* (2006.01)
   *F16H 57/035* (2012.01)

(56) References Cited

U.S. PATENT DOCUMENTS

| | | | |
|---|---|---|---|
| 5,073,147 A * | 12/1991 | Takano et al. | 474/28 |
| 5,184,981 A * | 2/1993 | Wittke | 474/19 |
| 5,407,394 A * | 4/1995 | Robbins | 474/28 |
| 5,427,578 A * | 6/1995 | Iijima | 474/18 |
| 5,468,192 A * | 11/1995 | Robbins | 474/28 |
| 5,766,105 A * | 6/1998 | Fellows et al. | 474/18 |
| 5,776,022 A * | 7/1998 | Schellekens | 474/18 |
| 6,241,635 B1 * | 6/2001 | Schmid et al. | 474/11 |
| 6,350,212 B1 * | 2/2002 | Campagnolo | 474/80 |
| 6,361,470 B1 * | 3/2002 | Friedmann et al. | 477/37 |
| 6,506,136 B2 * | 1/2003 | Schmid et al. | 474/18 |
| 7,048,657 B2 * | 5/2006 | Faust et al. | 474/18 |
| 7,556,576 B2 * | 7/2009 | Mochizuki et al. | 474/18 |
| 7,753,814 B2 * | 7/2010 | Nozawa et al. | 474/28 |
| 7,794,344 B2 * | 9/2010 | Ishioka et al. | 474/28 |
| 7,811,187 B2 * | 10/2010 | Koyama | 474/28 |
| 7,988,573 B2 * | 8/2011 | Shioiri et al. | 474/19 |
| 8,012,050 B2 * | 9/2011 | Aitcin et al. | 474/8 |
| 8,798,882 B2 * | 8/2014 | Monfette et al. | 701/61 |
| 2001/0016528 A1 * | 8/2001 | Kashiwase | 474/28 |
| 2001/0031678 A1 * | 10/2001 | Schmid et al. | 474/18 |
| 2002/0056327 A1 | 5/2002 | Reik et al. | |
| 2005/0014584 A1 * | 1/2005 | Katou et al. | 474/28 |
| 2005/0153805 A1 * | 7/2005 | Koyama | 474/28 |
| 2005/0192132 A1 * | 9/2005 | Faust et al. | 474/18 |
| 2005/0197221 A1 * | 9/2005 | Nozawa et al. | 474/18 |
| 2005/0233842 A1 * | 10/2005 | Shioiri et al. | 474/19 |
| 2005/0250606 A1 * | 11/2005 | Shioiri et al. | 474/18 |
| 2005/0272539 A1 * | 12/2005 | Kouta | 474/18 |
| 2006/0111208 A1 * | 5/2006 | Hiramatsu et al. | 474/28 |
| 2006/0154761 A1 * | 7/2006 | Brown | 474/28 |
| 2006/0154762 A1 * | 7/2006 | Brown | 474/28 |
| 2006/0258493 A1 * | 11/2006 | Kauffeldt | 474/28 |
| 2007/0117664 A1 * | 5/2007 | Shioiri et al. | 474/28 |
| 2007/0197321 A1 * | 8/2007 | Ishioka et al. | 474/28 |
| 2007/0249440 A1 * | 10/2007 | Nozawa et al. | 474/28 |
| 2009/0017958 A1 * | 1/2009 | Kurihara | 475/210 |
| 2009/0062044 A1 * | 3/2009 | Shioiri et al. | 474/13 |

FOREIGN PATENT DOCUMENTS

| | | |
|---|---|---|
| JP | 2008-232389 | 10/2008 |
| JP | 2008-275017 | 11/2008 |
| JP | 2009-293736 | 12/2009 |
| JP | 2010-7737 | 1/2010 |

* cited by examiner

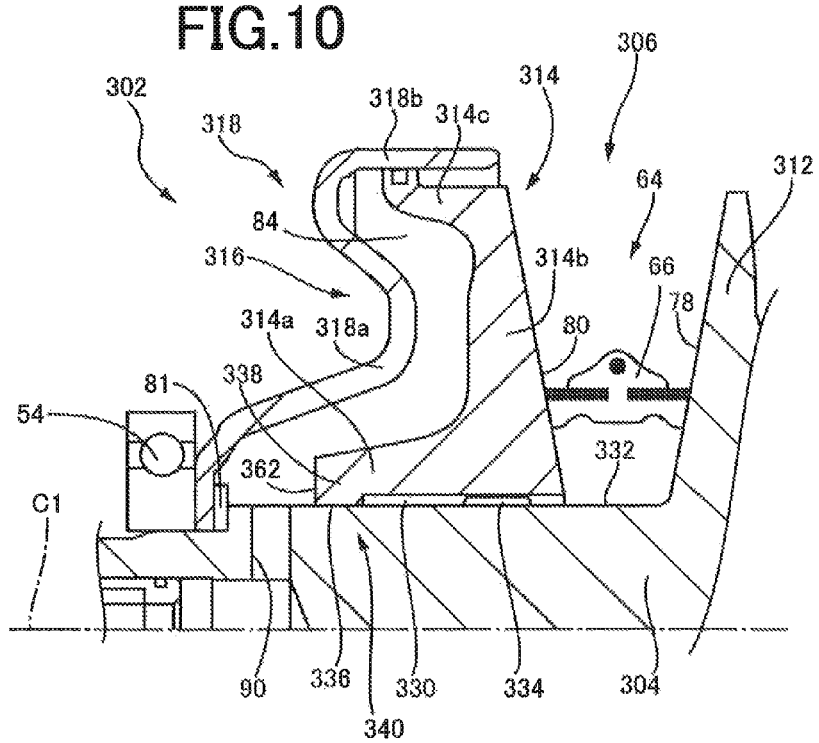
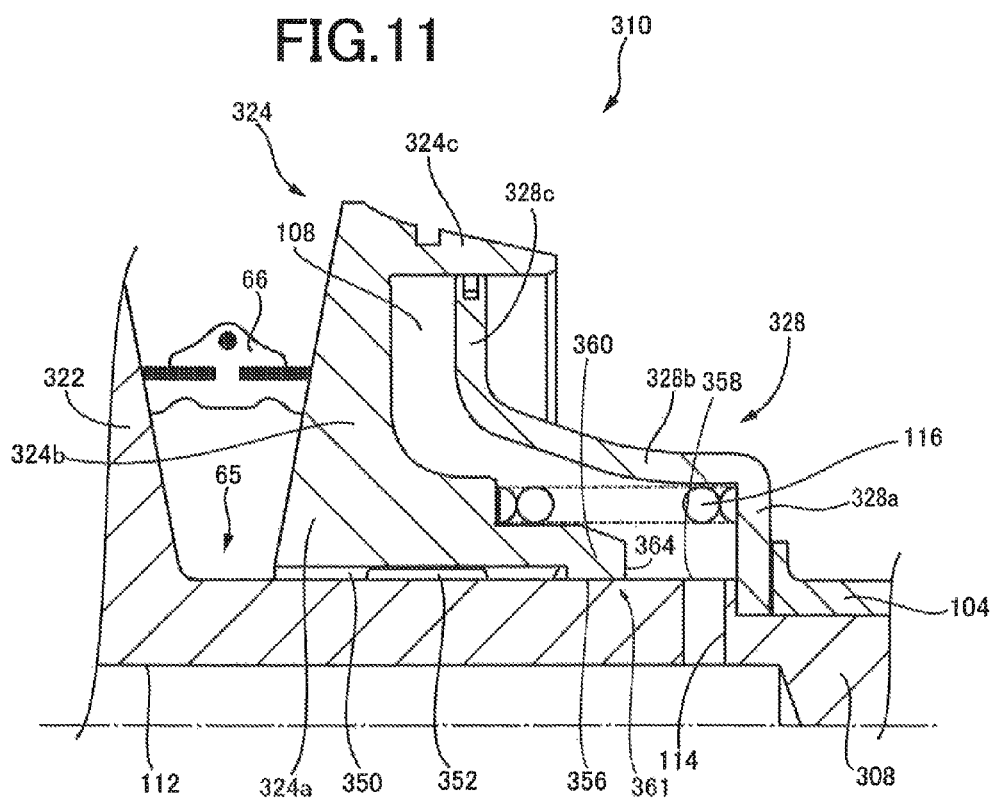

BELT-TYPE CONTINUOUSLY VARIABLE TRANSMISSION FOR VEHICLE

CROSS-REFERENCE TO RELATED APPLICATIONS

This application is a national phase application of International Application No. PCT/JP2010/065960, filed Sep. 15, 2010, the content of which is incorporated herein by reference.

TECHNICAL FIELD

The present invention relates to a belt-type continuously variable transmission for a vehicle and particularly to a structure with a movable sheave spline-fitted relatively non-rotatably and relatively movably in the axial direction to a fixed sheave.

BACKGROUND ART

A belt-type continuously variable transmission has hitherto been well known as one of continuously variable transmissions for vehicles. This belt-type continuously variable transmission includes a primary pulley and a secondary pulley on respective rotation axes disposed in parallel with each other and a transmission belt is wound around the both pulleys to transmit power. Each of the primary and secondary pulleys is made up mainly of a fixed sheave and a movable sheave and the movable sheave is moved relatively to the rotation axis in the axial direction to change a groove width formed between the fixed sheave and the movable sheave. A change in the groove width varies a winding position of the transmission belt, i.e., a winding radius of the transmission belt and, therefore, a gear ratio of the belt-type continuously variable transmission is continuously varied. For example, belt-type continuously variable transmissions of Patent Documents 1 to 3 are examples thereof. The basic configuration of the belt-type continuously variable transmissions of Patent Documents 1 to 3 will be described with reference to a cross-sectional view of a belt-type continuously variable transmission 600 depicted in FIG. 16.

As depicted in FIG. 16, the belt-type continuously variable transmission 600 mainly includes an input shaft 604 and an output shaft 606 disposed in parallel with each other in a case 602, a primary pulley 608 disposed on the side of the input shaft 604, a secondary pulley 610 disposed on the side of the output shaft 606, and a transmission belt 612 wound between the primary pulley 608 and the secondary pulley 610.

The input shaft 604 is disposed side-by-side with a torque converter 614 and a forward/reverse switching mechanism 616 on the same axial center C1 and rotation of an engine not depicted is transmitted via the torque converter 614 and the forward/reverse switching mechanism 616.

The primary pulley 608 is made up of a disc-shaped fixed sheave 618 formed integrally with an outer circumferential portion of the input shaft 604 and a movable sheave 620 spline-fitted relatively non-rotatably and relatively movably in the axial direction to the input shaft 604 with a V-groove 622 formed between the fixed sheave 618 and the movable sheave 620. The V-groove 622 is changed in groove width by relatively moving the movable sheave 620 in the axial direction by a hydraulic actuator 623. FIG. 16 depicts a state of the V-groove 622 with the widest groove width, i.e., a state of the belt-type continuously variable transmission 600 with the maximum gear ratio γmax on the upper side relative to the axial center C1 of the primary pulley 608 and the narrowest state of the V-groove 622, i.e., a state of the belt-type continuously variable transmission 600 with the minimum gear ratio γmin on the lower side relative to the axial center C1 of the primary pulley 608.

The secondary pulley 610 is made up of a disc-shaped fixed sheave 624 formed integrally with an outer circumferential portion of the output shaft 606 and a movable sheave 626 spline-fitted relatively non-rotatably and relatively movably in the axial direction to the output shaft 606 with a V-groove 628 formed between the fixed sheave 624 and the movable sheave 626. The V-groove 628 is changed in groove width by relatively moving the movable sheave 626 in the axial direction by a hydraulic actuator 630. FIG. 16 depicts the widest state of the V-groove 628, i.e., the state of the belt-type continuously variable transmission 600 with the minimum gear ratio γmin on the upper side relative to the axial center C2 of the secondary pulley 610 and the narrowest state of the V-groove 628, i.e., the state of the belt-type continuously variable transmission 600 with the maximum gear ratio γmax on the lower side relative to the axial center C2 of the secondary pulley 610.

The transmission belt 612 is wound between the V-groove 622 formed in the primary pulley 608 and the V-groove 628 formed in the secondary pulley 610, and a change in the groove widths of the respective V-grooves 622 and 628 varies a winding position, i.e., a winding radius of the transmission belt 612.

Thus, in the belt-type continuously variable transmission 600, the movable sheaves 620 and 626 are moved in the axial direction by the hydraulic actuators 623 and 630 to adjust the groove widths of the V-grooves 622 and 628 of the pulleys 608 and 610. As a result, the winding radiuses of the transmission belt 612 on the pulleys 608 and 610 are continuously varied and a gear ratio of the belt-type continuously variable transmission 600 is continuously varied.

FIG. 17 is an enlarged cross-sectional view of the vicinity of the input shaft 604 and the movable sheave 620 enlarged in the primary pulley 608 of FIG. 16. As depicted in FIG. 17, an inner circumferential portion of the movable sheave 620 of the primary pulley 608 has a seal portion 632 formed on the side of the transmission belt 612 in the axial direction and has a female spline 634 formed on the side opposite to the transmission belt 612, i.e., on the side of the hydraulic actuator 623, in the axial direction. A torque transmitting portion 636 is formed that transmits torque when a male spline 635 of the input shaft 604 and the female spline 634 of the movable sheave 620 are spline-fitted, and an oil passage portion 640 is formed for supplying operating oil to an oil pressure chamber 638 of the hydraulic actuator 623.

PRIOR ART DOCUMENTS

Patent Documents

Patent Document 1: Japanese Laid-Open Patent Publication No. 2008-275017
Patent Document 2: Japanese Laid-Open Patent Publication No. 2008-232389
Patent Document 3: Japanese Laid-Open Patent Publication No. 2008-208861

SUMMARY OF THE INVENTION

Problems to be Solved by the Invention

The primary pulley 608 must receive a radial load (reaction force load) acting thereon when the transmission belt 612 is clamped, and the female spline 634 and the seal portion 632 depicted in FIG. 17 function as radial load receiving surfaces receiving the radial load. The radial load is a load acting perpendicularly on a surface. This radial load is known to be greater as a distance from the transmission belt 612 is increased in the axial direction and the female spline 634 receives a greater radial load as compared to the seal portion 632. Since the primary pulley 608 has spline teeth formed in the female spline 634 receiving the greater radial load, the female spline 634 of the movable sheave 620 comes into contact only at tooth tip surfaces with an outer circumferential surface of the input shaft 604 and, therefore, a contact area is made smaller between the input shaft 604 and the movable sheave 620. However, since a predetermined contact area must be ensured for receiving the radial load, a shaft length of the female spline 634 must be elongated, resulting in a problem of the primary pulley 608 elongated in the axial direction.

As depicted in FIG. 17, stepped portions 642 and 646 are formed on the input shaft 604 and the movable sheave 620, respectively, so as to define the position of the movable sheave 620 achieving the minimum gear ratio γmin of the belt-type continuously variable transmission 600 in the primary pulley 608. The stepped portions 642 and 646 abut on each other as depicted on the lower side relative to the axial center C1 in the primary pulley 608 of FIG. 16 to achieve the minimum gear ratio γmin. Although the movable sheave 620 is positioned to achieve the minimum gear ratio γmin as explained above, the stepped portions 642 and 646 must be formed on the input shaft 604 and the movable sheave 620, respectively. When the stepped portion 642 is formed on the input shaft 604, a shaft diameter must be increased by the stepped portion 642 and the input shaft 604 is problematically made radially larger.

Although the seal portion 632 has a structure sealed by bringing the outer circumferential surface of the input shaft 604 and an inner circumferential surface of the movable sheave 620 into sliding contact with each other, since the seal structure is formed simply by bringing the metals into contact with each other, leakage of operating oil inevitably occurs. The oil leakage amount varies depending on the gear ratio γ of the belt-type continuously variable transmission 600. For example, while the belt-type continuously variable transmission 600 is at the maximum gear ratio γmax, the primary pulley 608 depicted in FIG. 16 is located as depicted on the upper side relative to the axial center C1 and this minimizes the length of the seal portion 632 in the axial direction, i.e., the seal width of the seal portion 632 formed by the contact between the outer circumferential surface of the input shaft 604 and the inner circumferential surface of the movable sheave 620. On the other hand, while the belt-type continuously variable transmission 600 is at the minimum gear ratio γmin, the primary pulley 608 is located as depicted on the lower side relative to the axial center C1 and this maximizes the length of the seal portion 632 in the axial direction, i.e., the seal width of the seal portion 632 formed by the contact between the outer circumferential surface of the input shaft 604 and the inner circumferential surface of the movable sheave 620. Since the seal width of the seal portion 632 varies depending on the gear ratio γ of the belt-type continuously variable transmission 600 as described above, the leakage amount of the operating oil from the seal portion 632 accordingly varies in a complicated manner. Since the leakage amount of the operating oil varies in a complicated manner in accordance with the variation of the seal width of the seal portion 632, the hydraulic actuator 623 of the primary pulley 608 has a problem of reduced controllability of oil pressure. The problems described above also occur in the secondary pulley 610.

The present invention was conceived in view of the situations and it is therefore an object of the present invention to provide a structure of a belt-type continuously variable transmission for a vehicle enabling reduction in shaft length and shaft diameter and enabling suppression of reduction in controllability in the belt-type continuously variable transmission for a vehicle.

In the Description

To achieve the object, the first aspect of the invention provides (a) a belt-type continuously variable transmission for a vehicle comprising: a primary pulley including a first fixed sheave fixed to an input shaft, and a first movable sheave relatively non-rotatable and relatively movable in axial direction to the input shaft due to spline-fitting of a female spline formed on an inner circumferential portion thereof to a male spline formed on the input shaft; a secondary pulley including a second fixed sheave fixed to an output shaft in parallel with the input shaft, and a second movable sheave relatively non-rotatable and relatively movable in the axial direction to the output shaft due to spline-fitting of a female spline formed on an inner circumferential portion thereof to a male spline formed on the output shaft; and a transmission belt wound around a V-shaped first pulley groove formed between the first fixed sheave and the first movable sheave and a V-shaped second pulley groove formed between the second fixed sheave and the second movable sheave, (b) the female spline formed on the inner circumferential portion of the first movable sheave of the primary pulley being formed on the transmission belt side in the axial direction when the transmission belt is wound around the first pulley groove, the first movable sheave having a first cylindrical portion with cylindrical shape formed on the side opposite to the transmission belt side in the axial direction, the first cylindrical portion having an inner circumferential surface in sliding contact with an outer circumferential surface of the input shaft, (c) the female spline formed on the inner circumferential portion of the second movable sheave of the secondary pulley being formed on the transmission belt side in the axial direction when the transmission belt is wound around the second pulley groove, the second movable sheave having a second cylindrical portion with cylindrical shape formed on the side opposite to the transmission belt side in the axial direction, the second cylindrical portion having an inner circumferential surface in sliding contact with an outer circumferential surface of the output shaft, (d) the belt-type continuously variable transmission for a vehicle disposed with at least one of a first groove width defining portion disposed on the primary pulley for defining a maximum groove width of the first pulley groove and a second groove width defining portion disposed on the secondary pulley for defining a maximum groove width of the second pulley groove, (e) the first groove width defining portion and the second groove width defining portion being disposed on one shaft of the input shaft and the output shaft, and the other shaft having a uniform shaft diameter in a range of sliding of the first movable sheave or the second movable sheave in the axial direction except a site with the male spline formed, the other shaft being disposed on the opposite side to the one shaft.

The Effects of the Invention

Consequently, when the primary pulley is disposed with the first groove width defining portion, the maximum groove width of the first pulley groove is defined. If the primary pulley is also disposed with the well-known stepped portions defining the minimum groove width of the first pulley groove on the input shaft and the first movable sheave, the minimum groove width and the maximum groove width of the second pulley groove of the secondary pulley are uniquely determined depending on the minimum groove width and the maximum groove width of the primary pulley. Therefore, since the need for disposing a stepped portion defining the minimum groove width and the maximum groove width of the second pulley groove is eliminated in the secondary pulley, the shaft diameter of the output shaft is prevented from increasing due to the disposition of the stepped portion.

When the secondary pulley is disposed with the second groove width defining portion, the maximum groove width of the second pulley groove is defined. If the secondary pulley is also disposed with the well-known stepped portions defining the minimum groove width of the second pulley groove on the output shaft and the second movable sheave, the minimum groove width and the maximum groove width of the first pulley groove of the primary pulley are uniquely determined depending on the minimum groove width and the maximum groove width of the secondary pulley. Therefore, since the need for disposing a stepped portion defining the minimum groove width and the maximum groove width of the first pulley groove is eliminated in the primary pulley, the shaft diameter of the input shaft is prevented from increasing due to the disposition of the stepped portion.

When the primary pulley is disposed with the first groove width defining portion and the secondary pulley is disposed with the second groove width defining portion, the maximum groove width of the first pulley groove and the maximum groove width of the second pulley groove are defined. When the first pulley groove is set to the maximum groove width, the second pulley groove is set to the minimum groove width, and when the second pulley groove is set to the maximum groove width, the first pulley groove is set to the minimum groove width and, therefore, the need for disposing stepped portions for defining the minimum groove widths of the respective pulley grooves on the input shaft and the output shaft is eliminated. As a result, since the need for disposing the stepped portions for defining the minimum groove widths of the respective pulley grooves on the input shaft and the output shaft is eliminated, the shaft diameters of the input shaft and the output shaft are prevented from increasing due to the disposition of the stepped portions.

Since the first cylindrical portion with cylindrical shape in sliding contact with the outer circumferential surface of the input shaft is formed in the first movable sheave on the side opposite to the transmission belt in the axial direction, the contact area is increased in the contact between the inner circumferential surface of the first movable sheave and the outer circumferential surface of the input shaft on the side opposite to the transmission belt, as compared to the conventional structure in which the tooth tip surfaces of the female spline of the movable sheave are in contact with the outer circumferential surface of the input shaft. Similarly, since the second cylindrical portion with cylindrical shape in sliding contact with the outer circumferential surface of the output shaft is formed in the second movable sheave on the side opposite to the transmission belt in the axial direction, the contact area is increased in the contact between the inner circumferential surface of the second movable sheave and the outer circumferential surface of the output shaft on the side opposite to the transmission belt, as compared to the conventional structure in which the tooth tip surfaces of the female spline of the movable sheave are in contact with the outer circumferential surface of the output shaft. When the primary pulley and the secondary pulley clamp the transmission belt, the reaction forces act as the radial loads acting perpendicularly on the contact surface between the inner circumferential surface of the first cylindrical portion and the outer circumferential surface of the input shaft and the contact surface between the inner circumferential surface of the second cylindrical portion and the outer circumferential surface of the output shaft; however, in this regard, the larger contact areas are ensured in the respective contact surfaces and, therefore, the radial loads can be accepted. This eliminates the need for elongating the shaft lengths of the primary pulley and the secondary pulley for ensuring the contact areas and the shaft lengths can even be shortened.

The length in the axial direction of the contact of the first cylindrical portion with the outer circumferential surface of the input shaft can be made constant in the range of sliding of the first cylindrical portion on the outer circumferential surface of the input shaft because a stepped portion etc., are not formed on the input shaft. Thus, when the sliding contact surface between the inner circumferential surface of the first cylindrical portion and the outer circumferential surface of the input shaft acts as the seal surface suppressing the leakage of the operating oil, the seal width does not change regardless of the position of the first movable sheave and, therefore, the leakage amount of the operating oil from the seal surface does not vary in a complicated manner depending on the position of the first movable sheave and the controllability of the oil pressure can be improved. Similarly, the length in the axial direction of the contact of the second cylindrical portion with the outer circumferential surface of the output shaft can be made constant in the range of sliding of the second cylindrical portion on the outer circumferential surface of the output shaft because a stepped portion etc., are not formed on the output shaft. Thus, when the sliding contact surface between the inner circumferential surface of the second cylindrical portion and the outer circumferential surface of the output shaft acts as the seal surface suppressing the leakage of the operating oil, the seal width does not change regardless of the position of the second movable sheave and, therefore, the leakage amount of the operating oil from the seal surface does not vary in a complicated manner depending on the position of the second movable sheave and the controllability of the oil pressure can be improved.

Preferably, when the first movable sheave moves closer to the first fixed sheave, a minimum groove width of the first sheave groove is defined at a position at which an end surface formed on a boundary between the female spline formed on the inner circumferential portion of the first movable sheave and the first cylindrical portion abuts on an end surface of the male spline formed on the input shaft. Consequently, the minimum groove width of the first pulley groove is defined at the position of abutment between the end surface formed on the first movable sheave and the end surface formed on the male spline of the input shaft, and the minimum groove width of the first pulley groove can be defined without disposing a stepped portion on the input shaft and the first movable sheave.

Preferably, when the second movable sheave moves closer to the second fixed sheave, a minimum groove width of the second sheave groove is defined at a position at which an end surface formed on a boundary between the female spline formed on the inner circumferential portion of the second movable sheave and the second cylindrical portion abuts on an end surface of the male spline formed on the output shaft. Consequently, the minimum groove width of the second pulley groove is defined at the position of abutment between the end surface formed on the second movable sheave and the end surface formed on the male spline of the output shaft, and the minimum groove width of the second pulley groove can be defined without disposing a stepped portion on the output shaft and the secondary movable sheave.

Preferably, the primary pulley is disposed with the first groove width defining portion defining the maximum groove width of the first pulley groove, wherein respective stepped portions are formed on an outer circumferential surface of the input shaft and an inner circumferential surface of the first movable sheave, and wherein a minimum groove width of the first pulley groove is defined at a position at which an end surface of the stepped portion of the first movable sheave abuts on an end surface of the stepped portion of the input shaft. This eliminates the need for disposing a mechanical mechanism defining the minimum groove width and the maximum groove width of the second pulley groove in the secondary pulley and, for example, the provision of a stepped portion for defining the minimum groove width of the second pulley groove can be avoided on the output shaft. When the first pulley groove is set to the minimum groove width, the second pulley groove is set to the maximum groove width in the secondary pulley in accordance with a change in the winding radius of the transmission belt. On the other hand, when the first pulley groove is set to the maximum groove width, the second pulley groove is set to the minimum groove width in the secondary pulley in accordance with a change in the winding radius of the transmission belt. As described above, the mechanical mechanism disposed in the primary pulley defines the minimum groove width and the maximum groove width of the second pulley groove.

Preferably, the secondary pulley is disposed with the second groove width defining portion defining the maximum groove width of the second pulley groove, wherein respective stepped portions are formed on an outer circumferential surface of the output shaft and an inner circumferential surface of the second movable sheave, and wherein a minimum groove width of the second pulley groove is defined at a position at which an end surface of the stepped portion of the second movable sheave abuts on an end surface of the stepped portion of the output shaft. This eliminates the need for disposing a mechanical mechanism defining the minimum groove width and the maximum groove width of the first pulley groove in the primary pulley and, for example, the provision of a stepped portion for defining the minimum groove width of the first pulley groove can be avoided on the input shaft. When the second pulley groove is set to the minimum groove width, the groove width of the first pulley groove is set to the maximum groove width in the primary pulley in accordance with a change in the winding radius of the transmission belt. On the other hand, when the second pulley groove is set to the maximum groove width, the groove width of the first pulley groove is set to the minimum in the primary pulley in accordance with a change in the winding radius of the transmission belt. Thus, the minimum groove width and the maximum groove width of the first pulley groove are defined by the mechanical mechanism disposed in the secondary pulley and defining the groove width of the second pulley groove.

Preferably, the primary pulley is disposed with the first groove width defining portion defining the maximum groove width of the first pulley groove, and wherein the secondary pulley is disposed with the second groove width defining portion defining the maximum groove width of the second pulley groove. This eliminates the need for disposing a stepped portion for defining the minimum groove width of the first pulley groove of the primary pulley and a stepped portion for defining the minimum groove width of the second pulley groove of the secondary pulley and, therefore, for example, the provision of stepped portions for defining the minimum groove widths of the respective pulley grooves can be avoided on the input shaft and the output shaft. When the first pulley groove is set to the maximum groove width, the groove width of the second pulley groove is defined at the minimum groove width in the secondary pulley in accordance with a change in the winding radius of the transmission belt. On the other hand, when the second pulley groove is set to the maximum groove width, the groove width of the first pulley groove is defined at the minimum groove width in the primary pulley in accordance with a change in the winding radius of the transmission belt. As described above, the minimum groove width of the first pulley groove and the minimum groove width of the second pulley groove are defined.

Preferably, the first groove width defining portion prevents movement of the first movable sheave to a side opposite to the first fixed sheave in the axial direction when an end surface of the first movable sheave on a side opposite to the first fixed sheave in the axial direction abuts on a predetermined member. As a result, when the end surface of the first movable sheave formed on the side opposite to the first fixed sheave abuts on the predetermined member, the first movable sheave is prevented from further moving in the axial direction and, therefore, the maximum groove width of the first pulley groove is defined.

Preferably, the second groove width defining portion prevents movement of the second movable sheave to a side opposite to the second fixed sheave in the axial direction when an end surface of the second movable sheave on a side opposite to the second fixed sheave in the axial direction abuts on a predetermined member. As a result, when the end surface of the second movable sheave formed on the side opposite to the second fixed sheave abuts on the predetermined member, the second movable sheave is prevented from further moving in the axial direction and, therefore, the maximum groove width of the second pulley groove is defined.

BRIEF DESCRIPTION OF THE DRAWINGS

FIG. 10 is an enlarged cross-sectional view of the vicinity of a spline-fitting portion of the primary movable sheave enlarged for explaining a spline structure of the primary pulley of FIG. 9.

FIG. 11 is an enlarged cross-sectional view of the vicinity of a spline-fitting portion of the secondary movable sheave enlarged for explaining a spline structure of the secondary pulley of FIG. 9.

MODES FOR CARRYING OUT THE INVENTION

Embodiments of the present invention will now be described in detail with reference to the drawings. The figures are simplified or deformed as needed in the following embodiments and portions are not necessarily precisely depicted in terms of dimension ratio, shape, etc.

FIRST EMBODIMENT

Figure 1:
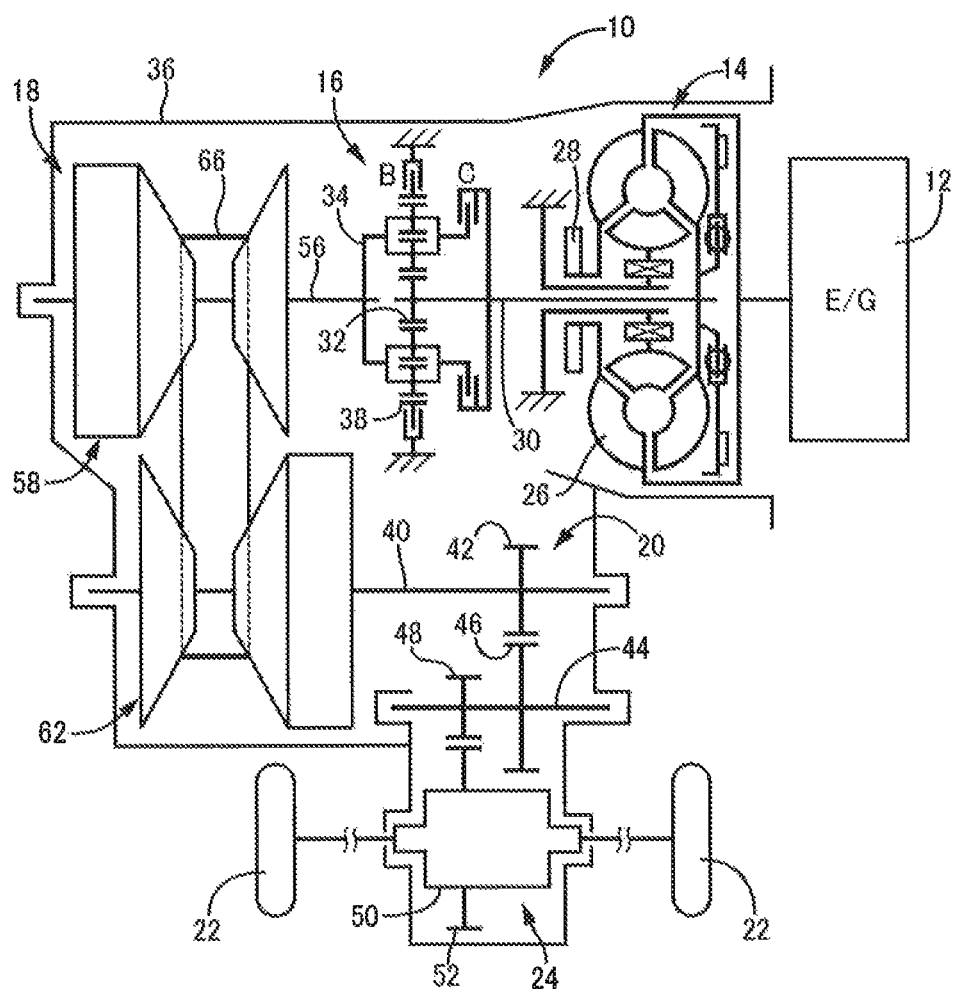
FIG. 1 is a schematic of a vehicle power transmission device to which the present invention is preferably applied.

FIG. 1 is a schematic of a vehicle power transmission device 10 to which the present invention is preferably applied. In FIG. 1, the vehicle power transmission device 10 is a device for an FF (front-engine front-drive) vehicle and is coupled to an engine 12 well-known as a drive source for a vehicle. The vehicle power transmission device 10 includes a torque converter 14 well-known as a fluid transmission device transmitting the torque of the engine 12 by using fluid as a medium, a forward/reverse switching device 16 switching the rotation direction of the torque transmitted from the torque converter 14 between a rotation direction for forward running of a vehicle and an inverse rotation direction opposite thereto for reverse running of a vehicle, a belt-type continuously variable transmission for a vehicle (hereinafter referred to as a continuously variable transmission) 18 converting the torque transmitted through the forward/reverse switching device 16 into a torque corresponding to a load, a reduction gear device 20 coupled to the output side of the continuously variable transmission 18, and a well-known so-called bevel-gear differential gear device 24 transmitting the torque transmitted via the reduction gear device 20 to a pair of left and right wheels 22 while allowing a rotation difference therebetween. A pump impeller 26 of the torque converter 14 is provided with a mechanical oil pump 28 generating an oil pressure used for the shift control of the continuously variable transmission 18 and the forward/reverse switching control of the forward/reverse switching device 16, for example.

The forward/reverse switching device 16 is made up mainly of a double-pinion planetary gear device including a sun gear 32 coupled to a turbine shaft 30 of the torque converter 14, a carrier 34 coupled to an input shaft 56 of the continuously variable transmission 18 and selectively coupled via a forward clutch C to the turbine shaft 30, and a ring gear 38 selectively coupled via a reverse brake B to a transaxle case 36 acting as a non-rotating member. Both the forward clutch C and the reverse brake B are hydraulic friction engagement devices frictionally engaged by an oil pressure supplied from the oil pump 28. In the forward/reverse switching device 16, when the forward clutch C is engaged and the reverse brake B is released, the planetary gear device is put into an integrally rotating state and a forward power transmission path is established. If the forward power transmission path is established, the torque transmitted from the torque converter 14 is output to the continuously variable transmission 18 without changing the rotation direction. When the reverse brake B is engaged and the forward clutch C is released in the forward/reverse switching device 16, the planetary gear device is put into an input/output inversely rotating state and a reverse power transmission path is established. If the reverse power transmission path is established, the torque transmitted from the torque converter 14 is output to the continuously variable transmission 18 with the rotation direction reversed. When both the forward clutch C and the reverse brake B are released, the forward/reverse switching device 16 is put into a neutral state (interrupting state) in which the power transmission is interrupted.

The reduction gear device 20 includes a first drive gear 42 fitted relatively non-rotatably to an outer circumferential surface of an output shaft 40 of the continuously variable transmission 18; a transmission shaft 44 disposed in parallel with the output shaft 40 and supported rotatably; a first driven gear 46 fitted relatively non-rotatably to an outer circumferential surface of the transmission shaft 44 to be engaged with the first drive gear 42; a second drive gear 48 projected outward from the outer circumferential surface of the transmission shaft 44; and a second driven gear (differential ring gear) 52 fitted relatively non-rotatably to an outer circumferential surface of a differential case 50 of the differential gear device 24 disposed in parallel with the transmission shaft 44 and supported rotatably, the second driven gear 52 engaged with the second drive gear 48. The first drive gear 42 and the second drive gear 48 are formed with a diameter smaller than the first driven gear 46 and the second driven gear 52. In the reduction gear device 20, during vehicle acceleration, the torque transmitted from the output shaft 40 of the continuously variable transmission 18 to the first drive gear 42 is output via the first driven gear 46, the transmission shaft 44, the second drive gear 48, and the second driven gear 52 to the differential case 50 of the differential gear device 24. During vehicle deceleration, an inverse drive force transmitted from a pair of the left and right wheels 22 is transmitted via the differential gear device 24 and the reduction gear device 20 to the output shaft 40 of the continuously variable transmission 18.

Figure 2:
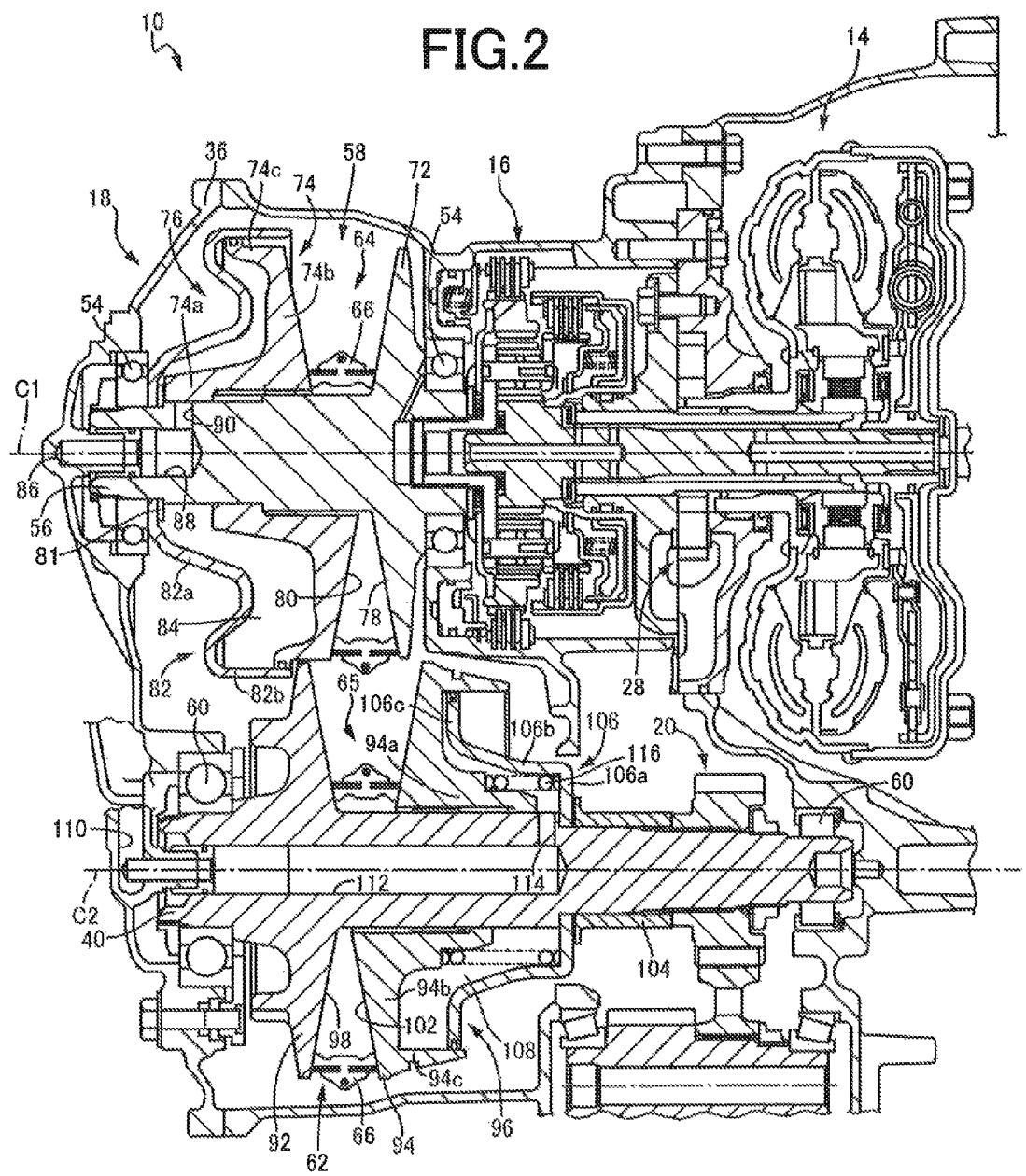
FIG. 2 is a cross-sectional view of a portion of the vehicle power transmission device depicted in FIG. 1.

FIG. 2 is a cross-sectional view of a portion of the vehicle power transmission device 10 depicted in FIG. 1. In FIG. 2, the continuously variable transmission 18 includes an input shaft 56 supported rotatably around an axial center C1 via a pair of bearings 54 by the transaxle case 36, a primary pulley (input-side groove width variable pulley) 58 disposed on the outer circumferential side of the input shaft 56, the output shaft 40 disposed in parallel with the input shaft 56 and supported rotatably around an axial center C2 via a pair of bearings 60 by the transaxle case 36, a secondary pulley (output-side groove width variable pulley) 62 disposed on the outer circumferential side of the output shaft 40, and a well-known endless annular transmission belt 66 wound around each of the primary pulley 58 and the secondary pulley 62 to transmit power through a frictional force between the both pulleys.

The primary pulley 58 includes a disc-shaped primary fixed sheave 72 (first fixed sheave) fixed to the outer circumferential side of the input shaft 56, a primary movable sheave 74 (first movable sheave) spline-fitted relatively non-rotatably and relatively movably in the axial center C1 direction to the input shaft 56 so as to form a V-shaped first pulley groove 64 with the primary fixed sheave 72, and a primary hydraulic actuator 76 moving the primary movable sheave 74 in the axial center C1 direction depending on a supplied oil pressure and making the primary movable sheave 74 and the primary fixed sheave 72 closer to or further from each other so as to change the groove width of the first pulley groove 64.

The primary fixed sheave 72 is a disc-shaped member integrally disposed on the input shaft 56 and projecting outward from an outer circumferential surface of the input shaft 56. The primary fixed sheave 72 has a conical taper surface 78 formed on a surface facing the primary movable sheave 74 with a distance from the primary movable sheave 74 increasing toward the outer circumferential side.

The primary movable sheave 74 has an inner cylindrical portion 74a spline-fitted relatively movably in the axial center C1 direction and relatively non-rotatably around the axial center C1 to the input shaft 56, a disc portion 74b integrally disposed on and projecting outward from one end portion of the inner cylindrical portion 74a on the side of the primary fixed sheave 72, and an outer cylindrical portion 74c projected in the axial center C1 direction from an outer circumferential portion of the disc portion 74b toward the side opposite to the primary fixed sheave 72. The disc portion 74b has a conical taper surface 80 formed on a surface facing the primary fixed sheave 72 with a distance from the primary fixed sheave 72 increasing toward the outer circumferential side. The taper surface 80 forms the first pulley groove 64 with the taper surface 78 of the primary fixed sheave 72.

The primary hydraulic actuator 76 includes a bottomed-cylindrical cylinder member 82 disposed at one end portion of the input shaft 56 on the side opposite to the primary fixed sheave 72 relative to the primary movable sheave 74 for forming an oil-tight oil pressure chamber 84 with the primary movable sheave 74. The cylinder member 82 includes a folded wall portion 82a prevented from moving in the axial direction because an inner circumferential portion thereof is sandwiched between a spacer 81 fitted to a stepped end surface formed on the input shaft 56 and the bearings 54, and a cylindrical portion 82b that is projected circumferentially continuously from an outer circumferential portion of the wall portion 82a to the outer circumferential side of the outer cylindrical portion 74c of the primary movable sheave 74 and that slides via an oil seal on an outer circumferential surface of the outer cylindrical portion 74c of the primary movable sheave 74. The oil pressure chamber 84 is formed in a space surrounded in an oil-tight manner by the cylinder member 82, the primary movable sheave 74, and the input shaft 56. The oil pressure chamber 84 is supplied with an oil pressure transferred from the oil pump 28 and appropriately adjusted by a hydraulic control circuit not depicted through each of a first oil passage 86 formed in the transaxle case 36, a second oil passage 88 formed on the inner circumferential side of the input shaft 56 in communication with the first oil passage 86, and a third oil passage 90 formed to radially penetrate the input shaft 56 from the second oil passage 88.

In the primary pulley 58, the primary movable sheave 74 moves closer to or away from the primary fixed sheave 72 in the axial center C1 direction depending on the oil pressure supplied to the oil pressure chamber 84 to change the width of the first pulley groove 64. In FIG. 2, the primary movable sheave 74 indicated by a solid line on the lower side relative to the axial center C1 represents the state in which the first pulley groove 64 formed with the primary fixed sheave 72 is set to a minimum groove width Wmin. In this state, the winding radius of the transmission belt 66 is maximized and a gear ratio $\gamma$ of the belt-type continuously variable transmission 18 is set to a minimum gear ratio $\gamma$min. The primary movable sheave 74 indicated by a solid line on the upper side relative to the axial center C1 represents the state in which the first pulley groove 64 formed with the primary fixed sheave 72 is set to a maximum groove width Wmax. In this state, the winding radius of the transmission belt 66 is minimized and the gear ratio $\gamma$ of the belt-type continuously variable transmission 18 is set to a maximum gear ratio $\gamma$max.

The secondary pulley 62 includes a secondary fixed sheave 92 (second fixed sheave) fixed to the outer circumferential side of the output shaft 40, a secondary movable sheave 94 (second movable sheave) spline-fitted relatively non-rotatably and relatively movably in the axial center C2 direction to the output shaft 40 so as to form a V-shaped second pulley groove 65 with the secondary fixed sheave 92, and a secondary hydraulic actuator 96 moving the secondary movable sheave 94 in the axial center C2 direction depending on a supplied oil pressure and making the secondary movable sheave 94 and the secondary fixed sheave 92 closer to or further from each other so as to change the groove width of the second pulley groove 65.

The secondary fixed sheave 92 is a disc-shaped member integrally disposed on the output shaft 40 and projecting outward from the outer circumferential surface of the output shaft 40. The secondary fixed sheave 92 has a conical taper surface 98 formed on a surface facing the secondary movable sheave 94 with a distance from the secondary movable sheave 94 increasing toward the outer circumferential side.

The secondary movable sheave 94 has an inner cylindrical portion 94a spline-fitted relatively movably in the axial direction and relatively non-rotatably around the axial center C2 to the output shaft 40, a disc-shaped disc portion 94b integrally disposed on and projecting outward from one end portion of the inner cylindrical portion 94a on the side of the secondary fixed sheave 92, and an outer cylindrical portion 94c projected in the axial center C2 direction from an outer circumferential portion of the disc portion 94b toward the side opposite to the secondary fixed sheave 92. The disc portion 94b has a conical taper surface 102 formed on a surface facing the secondary fixed sheave 92 with a distance from the secondary fixed sheave 92 increasing toward the outer circumferential side. The taper surface 102 forms the second pulley groove 65 with the taper surface 98 of the secondary fixed sheave 92.

The secondary hydraulic actuator 96 includes a bottomed-cylindrical cylinder member 106 disposed at one end portion of the output shaft 40 on the side opposite to the secondary fixed sheave 92 relative to the secondary movable sheave 94 for forming an oil-tight oil pressure chamber 108 with the secondary movable sheave 94. The cylinder member 106 includes an inner circumferential wall portion 106a prevented from moving in the axial direction because an inner circumferential portion thereof is sandwiched between a stepped end surface formed on the output shaft 40 and a cylindrical member 104, a cylindrical portion 106b extended from an outer circumferential portion of the inner circumferential wall portion 106a toward the disc portion 94b of the secondary movable sheave 94, and an outer circumferential wall portion 106c that is projected circumferentially continuously outward from one end portion of the cylindrical portion 106b on the side of the secondary movable sheave 94 and that slides via an oil seal on an inner circumferential surface of the outer cylindrical portion 94c of the secondary movable sheave 94. The oil pressure chamber 108 is formed in a space surrounded in an oil-tight manner by the cylinder member 106, the secondary movable sheave 94, and the output shaft 40. The oil pressure chamber 108 is supplied with an oil pressure transferred from the oil pump 28 and appropriately adjusted by the hydraulic control circuit not depicted through each of a fourth oil passage 110 formed in the transaxle case 36, a fifth oil passage 112 formed on the inner circumferential side of the output shaft 40 in communication with the fourth oil passage 110, and a sixth oil passage 114 formed to radially penetrate the output shaft 40 from the fifth oil passage 112. A coil spring 116 biasing the secondary movable sheave 94 toward the secondary fixed sheave 92 is disposed between a stepped end surface formed on an outer circumferential surface of the inner cylindrical portion 94a of the secondary movable sheave 94 and the inner circumferential wall portion 106a of the cylinder member 106.

In the secondary pulley 62, a thrust force toward the secondary fixed sheave 92, i.e., a thrust force in the direction of clamping the transmission belt 66 is applied to the secondary movable sheave 94 depending on the oil pressure supplied to the oil pressure chamber 108. In FIG. 2, the secondary pulley 62 indicated by a solid line on the lower side relative to the axial center C2 represents the state in which the second pulley groove 65 formed between the secondary fixed sheave 92 and the secondary movable sheave 94 is set to the minimum groove width Wmin. In this state, the winding radius of the transmission belt 66 on the secondary pulley 62 is maximized and the gear ratio γ of the belt-type continuously variable transmission 18 is set to the maximum gear ratio γmax. The secondary pulley 62 indicated by a solid line on the upper side relative to the axial center C2 represents the state in which the second pulley groove 65 formed between the secondary fixed sheave 92 and the secondary movable sheave 94 is set to the maximum groove width Wmax. In this state, the winding radius of the transmission belt 66 on the secondary pulley 62 is minimized and the gear ratio γ of the belt-type continuously variable transmission 18 is set to the minimum gear ratio γmin.

The belt-type continuously variable transmission 18 configured as described above respectively changes the first pulley groove 64 of the primary pulley 58 and the second pulley groove 65 of the secondary pulley 62 to respectively change the winding radiuses of the transmission belt 66 on the primary pulley 58 and the secondary pulley 62, thereby continuously varying the gear ratio (rotation speed of the input shaft 56/rotation speed of the output shaft 40). If the winding radius of the transmission belt 66 on the primary pulley 58 is made smaller and the winding radius on the secondary pulley 62 is made larger, the gear ratio γ of the belt-type continuously variable transmission 18 is increased. If the winding radius of the transmission belt 66 on the primary pulley 58 is made larger and the winding radius on the secondary pulley 62 is made smaller, the gear ratio of the belt-type continuously variable transmission 18 is reduced.

Figure 3:
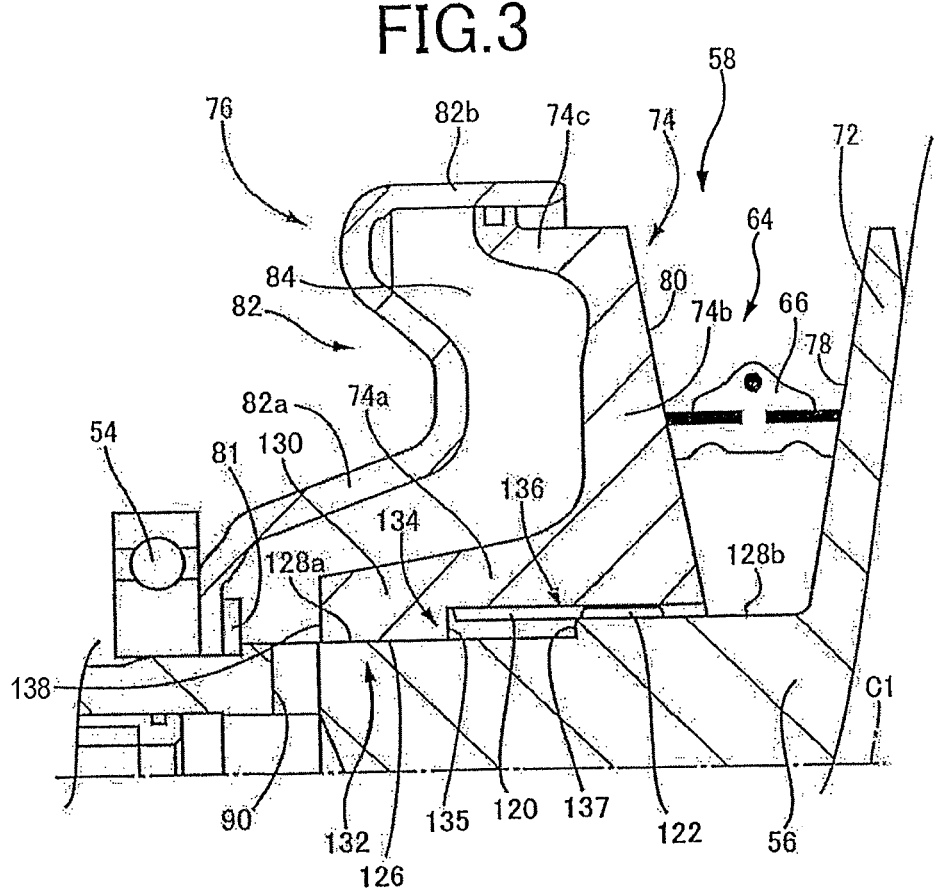
FIG. 3 is an enlarged cross-sectional view of the vicinity of a spline-fitting portion of the primary movable sheave enlarged for explaining a spline structure of the primary pulley of FIG. 2.

FIG. 3 is an enlarged cross-sectional view of the vicinity of a spline-fitting portion of the primary movable sheave 74 enlarged for explaining a spline structure of the primary pulley 58 of FIG. 2. As depicted in FIG. 3, a female spline 120 is formed in parallel with the axial center C1 on an inner circumferential portion of the primary movable sheave 74 on the side of the transmission belt 66 in the axial direction. This female spline 120 is spline-fitted to a male spline 122 formed on an outer circumferential surface 128 of the input shaft 56 and the primary movable sheave 74 is integrally rotated with the input shaft 56. Since the input shaft 56 has a stepped portion described later, the outer circumferential surface 128 of the input shaft 56 is made up of two steps. In this embodiment, the side with a smaller shaft diameter of the input shaft 56 is defined as an outer circumferential surface 128a and the side with a larger shaft diameter is defined as an outer circumferential surface 128b.

On the side of the bearing 54 in the axial direction of the primary movable sheave 74, i.e., on the side opposite to the transmission belt 66, a cylindrical portion with cylindrical shape 130 (first cylindrical portion) is formed that has an inner circumferential surface 126 (cylindrical surface) in sliding contact with the outer circumferential surface 128a of the input shaft 56, and the inner circumferential surface 126 of the cylindrical portion 130 and the outer circumferential surface 128a of the input shaft 56 are brought into sliding contact with each other without a gap to form a seal portion 132. In the seal portion 132, the leakage of operating oil supplied to the oil pressure chamber 84 of the primary hydraulic actuator 76 is suppressed by the metal contact between the inner circumferential surface 126 of the cylindrical portion 130 and the outer circumferential surface 128a of the input shaft 56 without a gap.

A stepped portion 134 is formed on the boundary between the female spline 120 of the primary movable sheave 74 and the cylindrical portion 130. A stepped portion 136 changing the shaft diameter of the input shaft 56 is formed in the vicinity of the male spline 122 of the input shaft 56, and an end surface 135 of the stepped portion 134 and an end surface 137 of the stepped portion 136 abut on each other to prevent the movement of the primary movable sheave 74 to the primary fixed sheave 72. Specifically, the state depicted on the lower side relative to the axial center C1 in FIG. 2 is achieved and the groove width of the first pulley groove 64 is set to the minimum groove width Wmin in this state. The belt-type continuously variable transmission 18 is set to achieve the minimum gear ratio γmin at the position of the minimum groove width Wmin of the first pulley groove 64, and the stepped portions 134 and 136 act as a positioning mechanism defining the position of the primary movable sheave 74 in the axial direction at which the belt-type continuously variable transmission 18 achieves the minimum gear ratio γmin.

On the other hand, the maximum groove width Wmax of the first pulley groove 64 of the primary pulley 58 is defined at the position of the abutment between an end surface 138 of the primary movable sheave 74 on the side of the bearing 54 (the side opposite to the primary fixed sheave 72) in the axial direction and an end surface of the spacer 81. Specifically, when the state depicted on the upper side relative to the axial center C1 in FIG. 2 is achieved, the end surface 138 of the primary movable sheave 74 abuts on the end surface of the spacer 81 to prevent the movement of the primary movable sheave 74 toward the bearing 54. At the position of the maximum groove width Wmax of the first pulley groove 64, the gear ratio γ of the belt-type continuously variable transmission 18 is set to the maximum gear ratio γmax, and the end surface 138 of the primary movable sheave 74 abuts on the end surface of the spacer 81 to achieve the maximum gear ratio γmax of the belt-type continuously variable transmission 18. Thus, in this embodiment, the belt-type continuously variable transmission 18 is provided with a mechanism defining the position of the primary movable sheave 74 achieving the minimum gear ratio γmin and a mechanism defining the position of the primary movable sheave 74 achieving the maximum gear ratio γmax, on the side of the primary pulley 58. The spacer 81 corresponds to a predetermined member abutting on an end surface of the first movable sheave on the side opposite to the first fixed sheave in the axial direction of the present invention, and the end surface 138 of the primary movable sheave 74 and the end surface of the spacer 81 make up a first groove width defining portion of the present invention.

Figure 4:
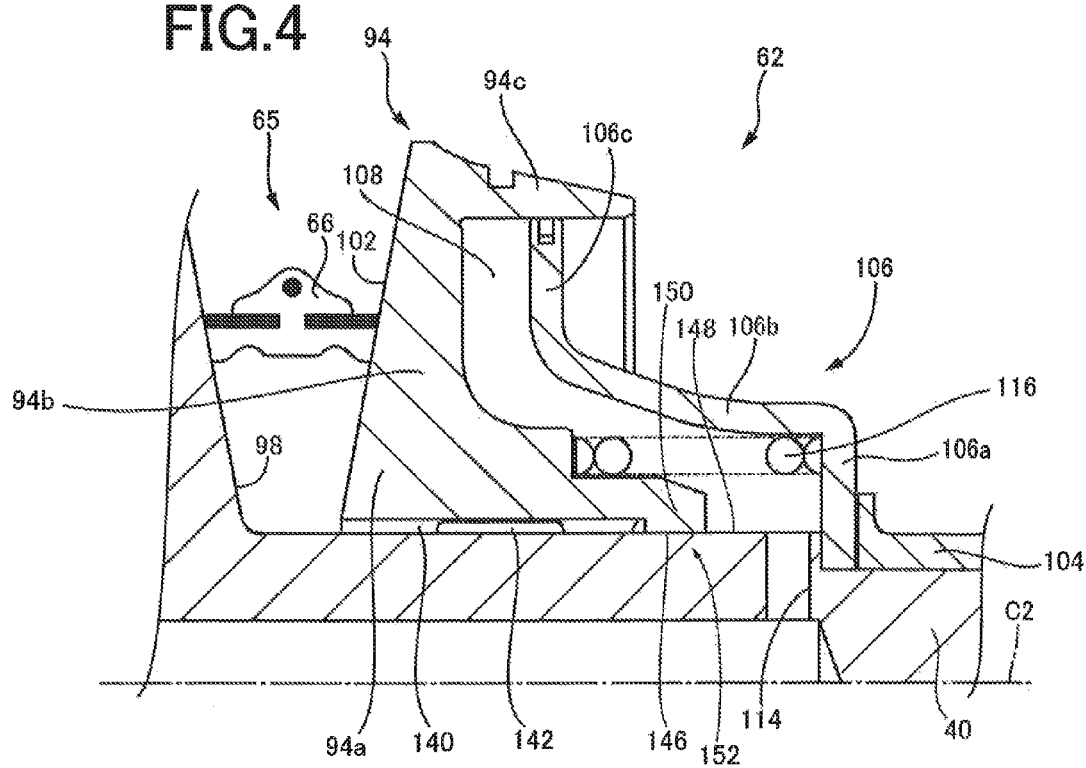
FIG. 4 is an enlarged cross-sectional view of the vicinity of a spline-fitting portion of the secondary movable sheave enlarged for explaining a spline structure of the secondary pulley of FIG. 2.

FIG. 4 is an enlarged cross-sectional view of the vicinity of a spline-fitting portion of the secondary movable sheave 94 enlarged for explaining a spline structure of the secondary pulley 62 of FIG. 2. In FIG. 4, a female spline 140 is formed in parallel with the axial center C2 on an inner circumferential portion of the secondary movable sheave 94 on the side of the transmission belt 66 in the axial direction. This female spline 140 is spline-fitted to a male spline 142 formed on an outer circumferential surface 148 of the output shaft 40 and the secondary movable sheave 94 is integrally rotated with the output shaft 40.

On the side of the cylindrical member 104 in the axial direction of the secondary movable sheave 94, i.e., on the side opposite to the transmission belt 66 in the axial direction, a cylindrical portion 150 (second cylindrical portion) is formed that has an inner circumferential surface 146 (cylindrical surface) in sliding contact with the outer circumferential surface 148 of the output shaft 40, and the inner circumferential surface 146 of the cylindrical portion 150 and the outer circumferential surface 148 of the output shaft 40 are brought into sliding contact with each other without a gap to form a seal portion 152. In the seal portion 152, the leakage of operating oil supplied to the oil pressure chamber 108 of the secondary hydraulic actuator 96 is suppressed by the metal contact between the inner circumferential surface 146 of the cylindrical portion 150 and the outer circumferential surface 148 of the output shaft 40 without a gap.

As depicted in FIG. 4, in the secondary pulley 62, the shaft diameter of the output shaft 40 is set constant in the range of the movement of the secondary movable sheave 94 in the axial direction except the site with the male spline 142 of the output shaft 40 formed. For example, a stepped portion etc., are not formed on the output shaft 40. This is because the belt-type continuously variable transmission 18 is provided with a mechanism (positioning mechanism) defining the positions of the primary movable sheave 74 in the axial direction for achieving the minimum gear ratio γmin and the maximum gear ratio γmax in the primary pulley 58.

The operation effects generated by forming the spline structures of the primary pulley 58 and the secondary pulley 62 of the belt-type continuously variable transmission 18 as described above will hereinafter be described.

Figure 5:
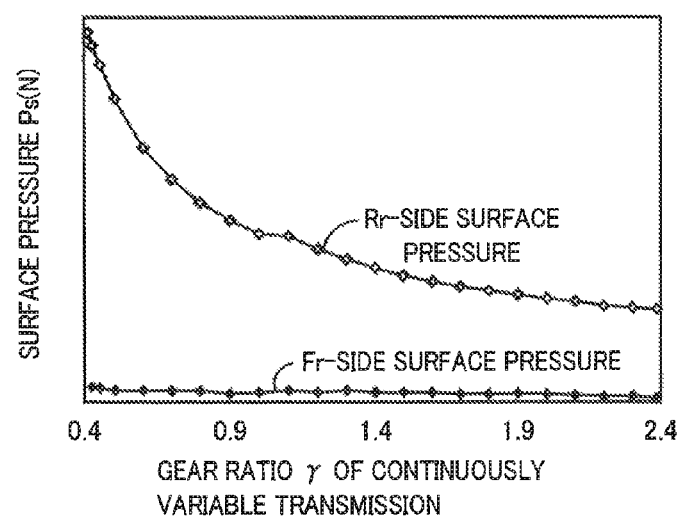
FIG. 5 depicts a calculation result of analytical calculation of magnitude of surface pressure acting on a surface of contact between a primary movable sheave and an input shaft of FIG. 2.

When the primary pulley 58 clamps the transmission belt 66, the reaction force acts via the primary movable sheave 74 on the input shaft 56. The outer circumferential surface 128 of the input shaft 56 accordingly receives the reaction force (radial load) from the surface of contact with the primary movable sheave 74. FIG. 5 depicts a calculation result of analytical calculation of magnitude of surface pressure acting on a surface of contact between a primary movable sheave and an input shaft generated when a transmission belt is clamped in a primary pulley similar to this embodiment. In FIG. 5, the horizontal axis indicates the gear ratio γ of the belt-type continuously variable transmission and the vertical axis indicates magnitude of surface pressure Ps (MPa). An Fr-side surface pressure Ps indicates the surface pressure Ps acting on the side of the transmission belt 66 in FIG. 3. On the other hand, an Rr-side surface pressure Ps indicates the surface pressure Ps acting on the side of the seal portion 132 in FIG. 3. As depicted in FIG. 5, although the Fr-side surface pressure Ps is almost unchanged even when the gear ratio γ of the belt-type continuously variable transmission varies, the Rr-side surface pressure Ps decreases as the gear ratio γ of the belt-type continuously variable transmission increases. The Rr-side surface pressure Ps becomes significantly larger than the Fr-side surface pressure Ps. Therefore, in the case of this embodiment, the Rr surface pressure Ps acting on the side of the seal portion 132 becomes larger than the Fr surface pressure Ps acting on the side of the transmission belt 66. In other words, the radial load acting on the side of the seal portion 132 becomes significantly larger than the radial load acting on the side of the transmission belt 66.

Therefore, the radial load acting on the seal portion 132 becomes larger and a contact area of the contact between the primary movable sheave 74 and the input shaft 56 must be ensured in the seal portion 132 for receiving the radial load. In this regard, because the inner circumferential surface 126 of the cylindrical portion 130 and the outer circumferential surface 128a of the input shaft 56 are in contact with each other without a gap, the seal portion 132 has a large contact area and can therefore receive a large radial load. In the conventional case, a female spline of the primary movable sheave is formed at the position of the seal portion 132 of this embodiment and only the tooth tip surfaces of the female spline are brought into contact with the input shaft. Therefore, because the contact area becomes significantly smaller, the length of the female spline in the axial direction must be elongated to ensure the contact area. In this embodiment, since the contact area is increased, the radial load acting on the seal portion 132 can be received without extending the length of the seal portion 132 in the axial direction.

As depicted in FIG. 3, although the inner circumferential surface 126 of the cylindrical portion 130 slides on the outer circumferential surface 128a of the input shaft 56 as the primary movable sheave 74 is moved in the shaft center direction, the length in the axial direction of the contact between the inner circumferential surface 126 of the cylindrical portion 130 and the outer circumferential surface 128a of the input shaft 56, i.e., the seal width of the seal portion 132 is constant regardless of a position of the primary movable sheave 74. Specifically, the seal width does not change because a stepped portion etc., are not formed on the outer circumferential surface 128a of the input shaft 56 in the range of sliding of the cylindrical portion 130 in the axial direction. Although only the site with the third oil passage 90 formed does not contact with the inner circumferential surface 126 of the cylindrical portion 130, the third oil passage 90 of this embodiment has a small cross-section area and, therefore, the contact area is almost unchanged. Although the leakage of the operating oil is suppressed in the seal portion 132 by the metal contact between the inner circumferential surface 126 of the cylindrical portion 130 and the outer circumferential surface 128a of the input shaft 56, the leakage of the operating oil cannot completely be suppressed because of the absence of an oil seal etc., resulting in leakage of a small amount of the operating oil. Since the seal width (contact area) of the seal portion 132 does not change regardless of the position of the primary movable sheave 74, i.e., the gear ratio γ of the belt-type continuously variable transmission 18, a leakage amount of the operating oil from the seal portion 132 can be predicted to some extent based on the oil pressure of the operating oil in the oil pressure chamber 84. Therefore, the controllability of the hydraulic control is improved by providing the hydraulic control of the primary hydraulic actuator 76 in consideration of the leakage amount.

In this embodiment, the primary pulley 58 is provided with a mechanical positioning structure defining the positions of the primary movable sheave 74 achieving the minimum gear ratio γmin and the maximum gear ratio γmax of the belt-type continuously variable transmission 18. In other words, the structure for the positioning is not formed in the secondary pulley 62. Therefore, as depicted in FIG. 4, the shaft diameter of the output shaft 40 is set constant in the range of sliding of the secondary movable sheave 94 except the site with the male spline 142 of the output shaft 40 formed. This prevents the output shaft 40 from thickening only in a stepped portion due to the formation of the stepped portion etc., thereby preventing the output shaft 40 from increasing in size. When the first pulley groove 64 is set to the minimum groove width Wmin, the second pulley groove 65 is set to the maximum groove width Wmax in the secondary pulley 62 in accordance with a change in the winding radius of the transmission belt 66 and the belt-type continuously variable transmission 18 achieves the minimum gear ratio γmin. On the other hand, when the first pulley groove 64 is set to the maximum groove width Wmax, the second pulley groove 65 is set to the minimum groove width Wmin in the secondary pulley 62 in accordance with a change in the winding radius of the transmission belt 66 and the belt-type continuously variable transmission 18 achieves the maximum gear ratio γmax. As described above, the mechanical mechanism disposed in the primary pulley 58 defines the minimum groove width Wmin and the maximum groove width Wmax of the second pulley groove 65.

When the secondary pulley 62 clamps the transmission belt 66, a radial load applied to the seal portion 152 also increases. In this regard, as is the case with the primary pulley 58, since the radial load is received by the contact surface between the inner circumferential surface 146 of the cylindrical portion 150 and the outer circumferential surface 148 of the output shaft 40, the contact area is made larger as compared to the case of forming female spline teeth etc., and, therefore, the radial load can be received without elongating the shaft length of the output shaft 40. In other words, since the radial load acting on the seal portion 152 can be received by the entire circumferential surface, the radial load can be received without extending the length of the seal portion 152 in the axial direction.

Although the inner circumferential surface 146 of the cylindrical portion 150 slides on the outer circumferential surface 148 of the output shaft 40 as the secondary movable sheave 94 is moved in the shaft center direction, the contact width, i.e., the seal width in the axial direction between the inner circumferential surface 146 of the cylindrical portion 150 and the outer circumferential surface 148 of the output shaft 40 is constant regardless of a position of the secondary movable sheave 94. Specifically, the seal width does not change because a stepped portion etc., are not formed on the outer circumferential surface 148 of the output shaft 40 in the range of sliding of the cylindrical portion 150 in the axial direction. Since the seal width is constant even if the position of the secondary movable sheave 94 in the axial direction is changed, as is the case with the primary pulley 58, a leakage amount of the operating oil from the seal portion 152 is a leakage amount corresponding to an oil pressure of the secondary hydraulic actuator 96. Therefore, the controllability of the hydraulic control is improved by providing the hydraulic control of the secondary hydraulic actuator 96 in consideration of the leakage amount.

As described above, in this embodiment, the primary pulley 58 is disposed with the spacer 81 preventing the movement of the primary movable sheave 74 to the side opposite to the primary fixed sheave 72 and, therefore, the maximum groove width Wmax of the first pulley groove 64 is defined. Since the primary pulley 58 is also disposed with the well-known stepped portions 134 and 136 defining the minimum groove width Wmin of the first pulley groove 64 on the input shaft 56 and the primary movable sheave 74, the minimum groove width Wmin and the maximum groove width Wmax of the second pulley groove 65 of the secondary pulley 62 are uniquely determined depending on the minimum groove width Wmin and the maximum groove width Wmax of the primary pulley 58. Therefore, since the need for disposing a stepped portion defining the minimum groove width Wmin of the second pulley groove 65 is eliminated in the secondary pulley 62, the shaft diameter of the output shaft 40 is prevented from increasing due to the disposition of the stepped portion.

According to this embodiment, since the cylindrical portion with cylindrical shape 130 in sliding contact with the outer circumferential surface 128a of the input shaft 56 is formed in the primary movable sheave 74 on the side opposite to the transmission belt 66 in the axial direction, the contact area is increased in the contact between the inner circumferential surface 126 of the primary movable sheave 74 and the outer circumferential surface 128a of the input shaft 56 on the side opposite to the transmission belt 66, as compared to the conventional structure in which the tooth tip surfaces of the female spline of the movable sheave are in contact with the outer circumferential surface of the input shaft. Similarly, since the cylindrical portion with cylindrical shape 150 in sliding contact with the outer circumferential surface 148 of the output shaft 40 is formed in the secondary movable sheave 94 on the side opposite to the transmission belt 66 in the axial direction, the contact area is increased in the contact between the inner circumferential surface 146 of the secondary movable sheave and the outer circumferential surface 148 of the output shaft 40 on the side opposite to the transmission belt 66, as compared to the conventional structure in which the tooth tip surfaces of the female spline of the movable sheave are in contact with the outer circumferential surface of the output shaft. When the primary pulley 58 and the secondary pulley 62 clamp the transmission belt 66, the reaction forces act as the radial loads acting perpendicularly on the contact surface between the inner circumferential surface 126 of the cylindrical portion 130 and the outer circumferential surface 128a of the input shaft 56 and the contact surface between the inner circumferential surface 146 of the cylindrical portion 150 and the outer circumferential surface 148 of the output shaft 40; however, in this regard, the larger contact areas are ensured in the respective contact surfaces and, therefore, the radial loads can be accepted. This eliminates the need for elongating the shaft lengths of the primary pulley 58 and the secondary pulley 62 for ensuring the contact areas and the shaft lengths can even be shortened.

According to this embodiment, the length in the axial direction of the contact of the cylindrical portion 130 with the outer circumferential surface 128a of the input shaft 56 can be made constant in the range of sliding of the cylindrical portion 130 on the outer circumferential surface 128a of the input shaft 56 because a stepped portion etc., are not formed on the input shaft 56. Thus, when the sliding contact surface between the inner circumferential surface 126 of the cylindrical portion 130 and the outer circumferential surface 128a of the input shaft 56 acts as the seal surface suppressing the leakage of the operating oil, the seal width does not change regardless of the position of the primary movable sheave 74 and, therefore, the leakage amount of the operating oil from the seal surface does not vary in a complicated manner depending on the position of the primary movable sheave 74 and the controllability of the oil pressure can be improved. Similarly, the length in the axial direction of the contact of the inner circumferential surface 146 of the cylindrical portion 150 with the outer circumferential surface 148 of the output shaft 40 can be made constant in the range of sliding of the cylindrical portion 150 on the outer circumferential surface 148 of the output shaft 40 because a stepped portion etc., are not formed on the output shaft 40. Thus, when the sliding contact surface between the inner circumferential surface 146 of the cylindrical portion 150 and the outer circumferential surface 148 of the output shaft 40 acts as the seal surface suppressing the leakage of the operating oil, the seal width does not change regardless of the position of the secondary movable sheave 94 and, therefore, the leakage amount of the operating oil from the seal surface does not vary in a complicated manner depending on the position of the secondary movable sheave 94 and the controllability of the oil pressure can be improved.

According to this embodiment, the primary pulley 58 is disposed with the spacer 81 defining the maximum groove width Wmax of the first pulley groove 64 and is disposed with the stepped portions 134 and 136 on the outer circumferential surface 128a of the input shaft 56 and the inner circumferential surface 126 of the primary movable sheave 74, respectively, to define the minimum groove width Wmin of the first pulley groove 64 at the position of the abutment of the end surface 135 of the stepped portion 134 of the primary movable sheave 74 on the end surface 137 of the stepped portion 136 of the input shaft 56. This eliminates the need for disposing a mechanical mechanism defining the minimum groove width Wmin and the maximum groove width Wmax of the second pulley groove 65 in the secondary pulley 62 and, for example, the provision of a stepped portion for defining the minimum groove width Wmin of the second pulley groove 65 can be avoided on the output shaft 40.

According to this embodiment, the movement of the primary movable sheave 74 to the side opposite to the primary fixed sheave 72 in the axial direction is prevented when the end surface 138 of the primary movable sheave 74 on the side opposite to the primary fixed sheave 72 in the axial direction abuts on the end surface of the spacer 81. As a result, when the end surface 138 of the primary movable sheave 74 abuts on the spacer 81, the primary movable sheave 74 is prevented from further moving in the axial direction and, therefore, the maximum groove width Wmax of the first pulley groove 64 is defined.

Other embodiments of the present invention will be described. In the following descriptions, the portions common to the embodiment are denoted by the same reference numerals and will not be described.

SECOND EMBODIMENT

Figure 6:
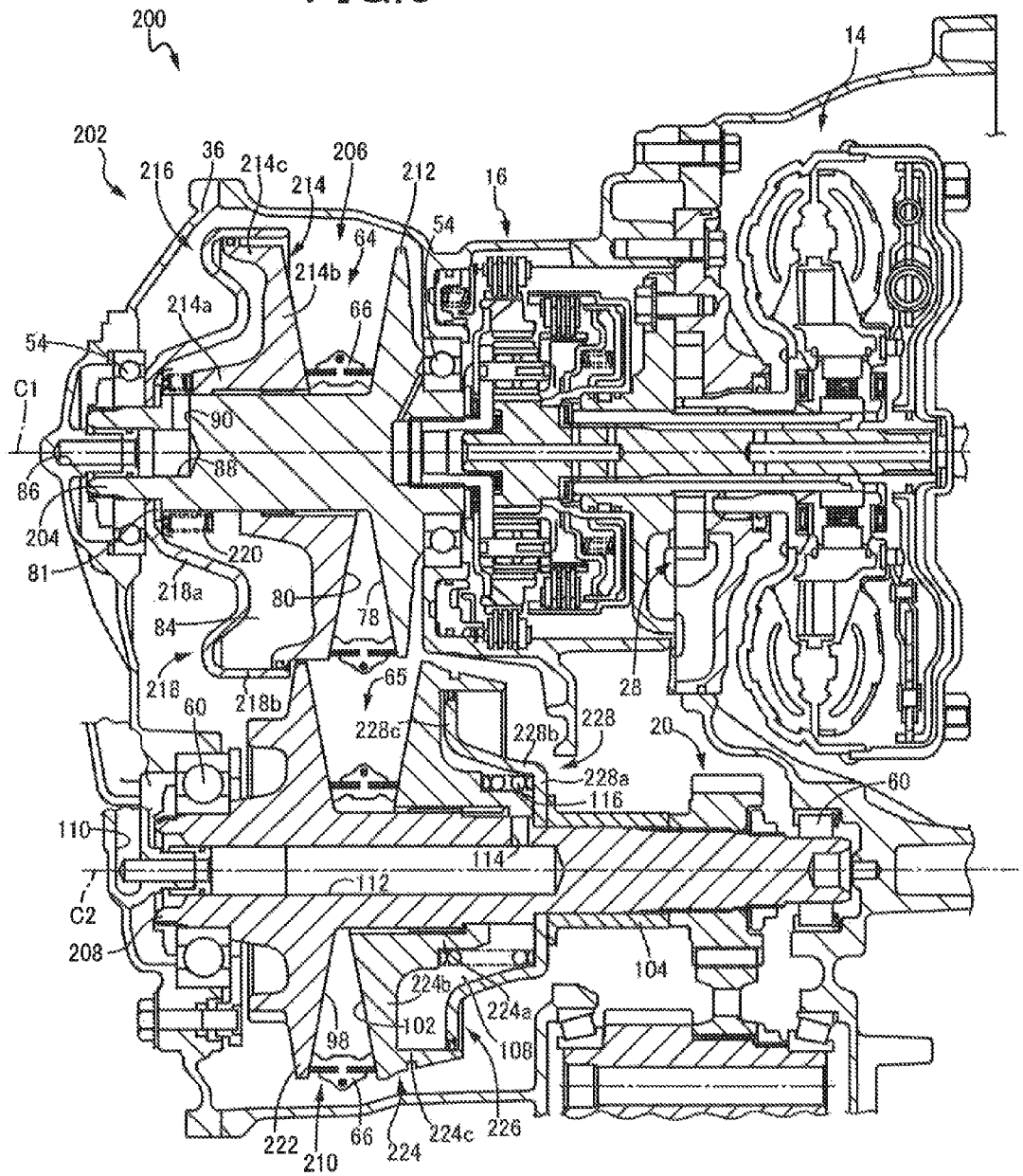
FIG. 6 is a cross-sectional view of a portion of a vehicle power transmission device that is another embodiment of the present invention, corresponding to FIG. 2.

FIG. 6 is a cross-sectional view of a portion of a vehicle power transmission device 200 that is another embodiment of the present invention, corresponding to FIG. 2. The vehicle power transmission device 200 of this embodiment includes a belt-type continuously variable transmission 202. The belt-type continuously variable transmission 202 includes an input shaft 204 supported rotatably around the axial center C1 via a pair of the bearings 54 by the transaxle case 36, a primary pulley (input-side groove width variable pulley) 206 disposed on the outer circumferential side of the input shaft 204, an output shaft 208 disposed in parallel with the input shaft 204 and supported rotatably around the axial center C2 via a pair of the bearings 60 by the transaxle case 36, a secondary pulley (output-side groove width variable pulley) 210 disposed on the outer circumferential side of the output shaft 208, and the well-known endless annular transmission belt 66 wound around each of the primary pulley 206 and the secondary pulley 210 to transmit power through a frictional force between the both pulleys.

The primary pulley 206 includes a disc-shaped primary fixed sheave 212 (first fixed sheave) fixed to the outer circumferential side of the input shaft 204, a primary movable sheave 214 (first movable sheave) disposed relatively non-rotatably and relatively movably in the axial direction on the input shaft 204 so as to form the first pulley groove 64 with the primary fixed sheave 212, and a primary hydraulic actuator 216 moving the primary movable sheave 214 in the axial center C1 direction depending on a supplied oil pressure and making the primary movable sheave 214 and the primary fixed sheave 212 closer to or further from each other so as to change the groove width of the first pulley groove 64.

The primary fixed sheave 212 is a disc-shaped member integrally disposed on the input shaft 204 and projecting outward from an outer circumferential surface of the input shaft 204. The primary fixed sheave 212 has the conical taper surface 78 formed on a surface facing the primary movable sheave 214 with a distance from the primary movable sheave 214 increasing toward the outer circumferential side.

The primary movable sheave 214 has an inner cylindrical portion 214a spline-fitted relatively movably in the axial direction and relatively non-rotatably around the axial center C1 to the input shaft 204, a disc portion 214b integrally disposed on and projecting outward from one end portion of the inner cylindrical portion 214a on the side of the primary fixed sheave 212, and an outer cylindrical portion 214c projected in the axial center C1 direction from an outer circumferential portion of the disc portion 214b toward the side opposite to the primary fixed sheave 214. The disc portion 214b has the conical taper surface 80 formed on a surface facing the primary fixed sheave 212 with a distance from the primary fixed sheave 212 increasing toward the outer circumferential side. The taper surface 80 forms the first pulley groove 64 with the taper surface 78 of the primary fixed sheave 212.

The primary hydraulic actuator 216 includes a bottomed-cylindrical cylinder member 218 disposed at one end portion of the input shaft 204 on the side opposite to the primary fixed sheave 212 relative to the primary movable sheave 214 for forming the oil-tight oil pressure chamber 84 with the primary movable sheave 214. The cylinder member 218 includes a folded wall portion 218a prevented from moving in the axial direction because an inner circumferential portion thereof is sandwiched between the spacer 81 fitted to a stepped end surface formed on the input shaft 204 and the bearings 54, and a cylindrical portion 218b that is projected circumferentially continuously from an outer circumferential portion of the wall portion 218a to the outer circumferential side of the outer cylindrical portion 214c of the primary movable sheave 214 and that slides via an oil seal on an outer circumferential surface of the outer cylindrical portion 214c of the primary movable sheave 214. The oil pressure chamber 84 is formed in a space surrounded in an oil-tight manner by the cylinder member 218, the primary movable sheave 214, and the input shaft 204. The oil pressure chamber 84 is supplied with an oil pressure transferred from the oil pump 28 and appropriately adjusted by the hydraulic control circuit not depicted through each of the first oil passage 86 formed in the transaxle case 36, the second oil passage 88 formed on the inner circumferential side of the input shaft 204 in communication with the first oil passage 86, and the third oil passage 90 formed to radially penetrate the input shaft 204 from the second oil passage 88.

In the oil pressure chamber 84, a spring 220 biasing the primary movable sheave 214 toward the primary fixed sheave 212 is inserted and disposed between the spacer 81 and the primary movable sheave 214.

In the primary pulley 206, the primary movable sheave 214 moves closer to or away from the primary fixed sheave 212 in the axial center C1 direction depending on the oil pressure supplied to the oil pressure chamber 84 to change the groove width of the first pulley groove 64. In FIG. 6, the primary movable sheave 214 indicated by a solid line on the lower side relative to the axial center C1 represents the state in which the first pulley groove formed with the primary fixed sheave 212 is set to the minimum groove width Wmin. In this state, the winding radius of the transmission belt 66 is maximized and the gear ratio γ of the belt-type continuously variable transmission 202 is set to the minimum gear ratio γmin. The primary movable sheave 214 indicated by a solid line on the upper side relative to the axial center C1 represents the state in which the first pulley groove 64 formed with the primary fixed sheave 212 is set to the maximum groove width Wmax. In this state, the winding radius of the transmission belt 66 is minimized and the gear ratio γ of the belt-type continuously variable transmission 202 is set to the maximum gear ratio γmax.

The secondary pulley 210 includes a secondary fixed sheave 222 (second fixed sheave) fixed to the outer circumferential side of the output shaft 208, a secondary movable sheave 224 (second movable sheave) disposed relatively non-rotatably and relatively movably in the axial direction on the output shaft 208 so as to form the second pulley groove 65 with the secondary fixed sheave 222, and a secondary hydraulic actuator 226 moving the secondary movable sheave 224 in the axial center C2 direction depending on a supplied oil pressure and making the secondary movable sheave 224 and the secondary fixed sheave 222 closer to or further from each other so as to change the groove width of the second pulley groove 65.

The secondary fixed sheave 222 is a disc-shaped member integrally disposed on the output shaft 208 and projecting outward from the outer circumferential surface of the output shaft 208. The secondary fixed sheave 222 has the conical taper surface 98 formed on a surface facing the secondary movable sheave 224 with a distance from the secondary movable sheave 224 increasing toward the outer circumferential side.

The secondary movable sheave 224 has an inner cylindrical portion 224a spline-fitted relatively movably in the axial direction and relatively non-rotatably around the axial center C2 to the output shaft 208, a disc-shaped disc portion 224b integrally disposed on and projecting outward from one end portion of the inner cylindrical portion 224a on the side of the secondary fixed sheave 222, and an outer cylindrical portion 224c projected in the axial center C2 direction from an outer circumferential portion of the disc portion 224b toward the side opposite to the secondary fixed sheave 222. The disc portion 224b has the conical taper surface 102 formed on a surface facing the secondary fixed sheave 222 with a distance from the secondary fixed sheave 222 increasing toward the outer circumferential side. The taper surface 102 forms the second pulley groove with the taper surface 98 of the secondary fixed sheave 222.

The secondary hydraulic actuator 226 includes a bottomed-cylindrical cylinder member 228 disposed at one end portion of the output shaft 208 on the side opposite to the secondary fixed sheave 222 relative to the secondary movable sheave 224 for forming the oil-tight oil pressure chamber 108 with the secondary movable sheave 224. The cylinder member 228 includes an inner circumferential wall portion 228a prevented from moving in the axial direction because an inner circumferential portion thereof is sandwiched between a stepped end surface formed on the output shaft 208 and the cylindrical member 104, a cylindrical portion 228b extended from an outer circumferential portion of the inner circumferential wall portion 228a toward the disc portion 224b of the secondary movable sheave 224, and an outer circumferential wall portion 228c that is projected circumferentially continuously outward from one end portion of the cylindrical portion 228b on the side of the secondary movable sheave 224 and that slides via an oil seal on an inner circumferential surface of the outer cylindrical portion 224c of the secondary movable sheave 224. The oil pressure chamber 108 is formed in a space surrounded in an oil-tight manner by the cylinder member 228, the secondary movable sheave 224, and the output shaft 208. The oil pressure chamber 108 is supplied with an oil pressure transferred from the oil pump 28 and appropriately adjusted by the hydraulic control circuit not depicted through each of the fourth oil passage 110 formed in the transaxle case 36, the fifth oil passage 112 formed on the inner circumferential side of the output shaft 208 in communication with the fourth oil passage 110, and the sixth oil passage 114 formed to radially penetrate the output shaft 208 from the fifth oil passage 112. The coil spring 116 biasing the secondary movable sheave 224 toward the secondary fixed sheave 222 is disposed between a stepped end surface formed on an outer circumferential surface of the inner cylindrical portion 224a of the secondary movable sheave 224 and the inner circumferential wall portion 228a of the cylinder member 228.

In the secondary pulley 210, a thrust force toward the secondary fixed sheave 222, i.e., a thrust force in the direction of clamping the transmission belt 66 is applied to the secondary movable sheave 224 depending on the oil pressure supplied to the oil pressure chamber 108. In FIG. 6, the secondary pulley 210 indicated by a solid line on the lower side relative to the axial center C2 represents the state in which the second pulley groove 65 formed between the secondary fixed sheave 222 and the secondary movable sheave 224 is set to the minimum groove width Wmin. In this state, the winding radius of the transmission belt 66 on the secondary pulley 210 is maximized and the gear ratio γ of the belt-type continuously variable transmission 202 is set to the maximum gear ratio γmax. The secondary pulley 210 indicated by a solid line on the upper side relative to the axial center C2 represents the state in which the second pulley groove 65 formed between the secondary fixed sheave 222 and the secondary movable sheave 224 is set to the maximum groove width Wmax. In this state, the winding radius of the transmission belt 66 on the secondary pulley 210 is minimized and the gear ratio γ of the belt-type continuously variable transmission 202 is set to the minimum gear ratio γmin.

Figure 7:
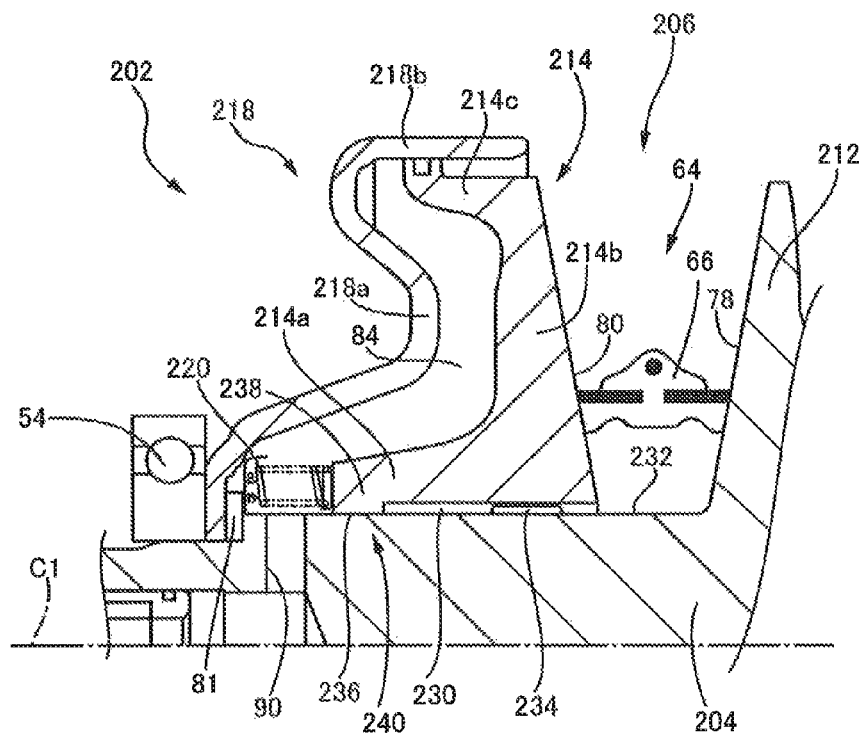
FIG. 7 is an enlarged cross-sectional view of the vicinity of a spline-fitting portion of the primary movable sheave enlarged for explaining a spline structure of the primary pulley of FIG. 6.

FIG. 7 is an enlarged cross-sectional view of the vicinity of a spline-fitting portion of the primary movable sheave 214 enlarged for explaining a spline structure of the primary pulley 206 of FIG. 6. As depicted in FIG. 7, a female spline 230 is formed in parallel with the axial center C1 on an inner circumferential portion of the primary movable sheave 214 on the side of the transmission belt 66 in the axial direction. This female spline 230 is spline-fitted to a male spline 234 formed on an outer circumferential surface 232 of the input shaft 204 and the primary movable sheave 214 is integrally rotated with the input shaft 204.

On the side of the bearing 54 in the axial direction of the primary movable sheave 214, i.e., on the side opposite to the transmission belt 66, a cylindrical portion 238 (first cylindrical portion) is formed that has an inner circumferential surface 236 in sliding contact with the outer circumferential surface 232 of the input shaft 204, and the inner circumferential surface 236 of the cylindrical portion 238 and the outer circumferential surface 232 of the input shaft 204 are brought into sliding contact with each other without a gap to form a seal portion 240. In the seal portion 240, the leakage of operating oil supplied to the oil pressure chamber 84 of the primary hydraulic actuator 216 is suppressed by the metal contact between the inner circumferential surface 236 of the cylindrical portion 238 and the outer circumferential surface 232 of the input shaft 204 without a gap.

Figure 8:
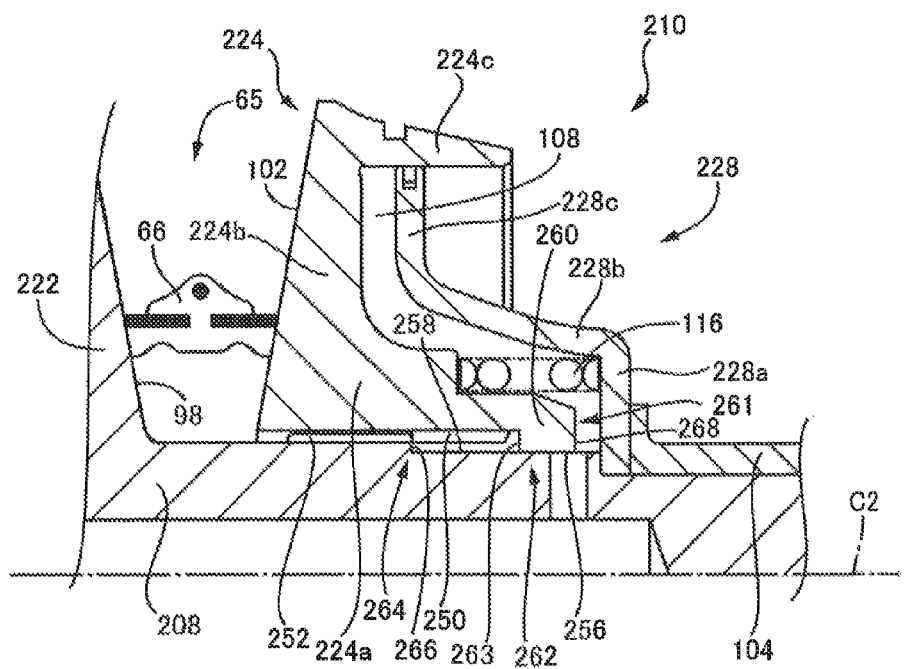
FIG. 8 is an enlarged cross-sectional view of the vicinity of a spline-fitting portion of the secondary movable sheave enlarged for explaining a spline structure of the secondary pulley of FIG. 6.

FIG. 8 is an enlarged cross-sectional view of the vicinity of a spline-fitting portion of the secondary movable sheave 224 enlarged for explaining a spline structure of the secondary pulley 210 of FIG. 6. In FIG. 8, a female spline 250 is formed in parallel with the axial center C2 on an inner circumferential surface of the secondary movable sheave 224 on the side of the transmission belt 66 in the axial direction. This female spline 250 is spline-fitted to a male spline 252 formed on an outer circumferential surface of the output shaft 208 and the secondary movable sheave 224 is integrally rotated with the output shaft 208.

On the side of the cylinder member 228 in the axial direction of the secondary movable sheave 224, i.e., on the side opposite to the transmission belt 66 in the axial direction, a cylindrical portion 260 (second cylindrical portion) is formed that has an inner circumferential surface 256 in sliding contact with the outer circumferential surface 258 of the output shaft 208, and the inner circumferential surface 256 of the cylindrical portion 260 and the outer circumferential surface 258 of the output shaft 208 are brought into metal contact with each other without a gap to form a seal portion 261 such that the seal portion 261 suppresses the leakage of the operating oil supplied to the oil pressure chamber 108 of the secondary hydraulic actuator 226.

A stepped portion 262 is formed on the boundary between the female spline 250 of the secondary movable sheave 224 and the cylindrical portion 260. A stepped portion 264 is also formed in the vicinity of the male spline 252 of the output shaft 208, and an end surface 263 of the stepped end surface 262 and an end surface 266 of the stepped portion 264 abut on each other to prevent the movement of the secondary movable sheave 224 toward the secondary fixed sheave 222. Specifically, the state depicted on the lower side relative to the axial center C2 in FIG. 6 is achieved and the groove width of the second pulley groove is set to the minimum groove width Wmin in this state. The belt-type continuously variable transmission 202 is set to achieve the maximum gear ratio γmax at the position of the minimum groove width Wmin of the second pulley groove, and the stepped portions 262 and 264 act as a positioning mechanism defining the position of the secondary movable sheave 224 in the axial direction at which the belt-type continuously variable transmission 202 achieves the maximum gear ratio γmax. In the primary pulley 206, the primary movable sheave 214 is biased toward the primary fixed sheave 212 by the spring 220 to clamp the transmission belt 66.

On the other hand, the maximum groove width Wmax of the second pulley groove 65 of the secondary pulley 210 is defined at the position of the abutment between an end surface 268 of the secondary movable sheave 224 on the side of the bearing 60, i.e., the side opposite to the secondary fixed sheave 222, in the axial direction and an end surface of the inner circumferential wall portion 228a of the cylinder member 228. Specifically, when the state depicted on the upper side relative to the axial center C2 in FIG. 6 is achieved and the secondary movable sheave 224 is moved toward the cylinder member 228, the end surface 268 of the secondary movable sheave 224 abuts on the end surface of the inner circumferential wall portion 228a of the cylinder member 228 to prevent the movement of the secondary movable sheave 224 toward the cylinder member 228. At the position of the maximum groove width Wmax of the second pulley groove 65, the belt-type continuously variable transmission 202 is set to achieve the minimum gear ratio γmin, and the end surface 268 of the secondary movable sheave 224 abuts on the end surface of the inner circumferential wall portion 228a to achieve the minimum gear ratio of the belt-type continuously variable transmission 202. Thus, in this embodiment, the belt-type continuously variable transmission 202 is provided with a mechanism defining the position of the secondary movable sheave 224 achieving the minimum gear ratio γmin and a mechanism defining the position of the secondary movable sheave 224 achieving the maximum gear ratio γmax, on the side of the secondary pulley 210. When the second pulley groove 65 is set to the minimum groove width Wmin, the first pulley groove 64 is set to the maximum groove width Wmax in the primary pulley 206 in accordance with a change in the winding radius of the transmission belt 66. On the other hand, when the second pulley groove 65 is set to the maximum groove width Wmax, the first pulley groove 64 is set to the minimum groove width Wmin in the primary pulley 206 in accordance with a change in the winding radius of the transmission belt 66. Thus, the minimum groove width Wmin and the maximum groove width Wmax of the first pulley groove 64 are defined by the mechanical mechanism disposed in the secondary pulley 210 and defining the groove width of the second pulley groove 65. The inner circumferential wall portion 228a corresponds to a predetermined member abutting on an end surface of the second movable sheave on the side opposite to the second fixed sheave in the axial direction of the present invention, and the end surface 268 of the secondary movable sheave 224 and the end surface of the inner circumferential wall portion 228a make up a second groove width defining portion.

In this embodiment, as depicted in FIG. 7, the shaft diameter of the input shaft 204 is set constant in the range of the movement of the primary movable sheave 224 in the axial direction except the site with the male spline 234 of the primary pulley 206 formed. For example, the input shaft 204 is not provided with a mechanism such as a stepped portion, defining the maximum groove width Wmax and the minimum groove width Wmin of the first pulley groove 64. This is because the belt-type continuously variable transmission 202 has the positioning mechanism of the secondary movable sheave 224 set in the secondary pulley 210 for achieving the minimum gear ratio γmin and the maximum gear ratio γmax of the belt-type continuously variable transmission 202.

In the belt-type continuously variable transmission 202 configured as described above, when the transmission belt 66 is clamped, a reaction load, i.e., a radial load significantly acts on the seal portion 240 of the primary movable sheave 214 and the seal portion 261 of the secondary movable sheave 224 as is the case with the embodiment. In this regard, since the inner circumferential surface 236 of the cylindrical portion 238 and the outer circumferential surface 232 of the input shaft 204 are brought into contact with each other, the seal portion 240 of the primary pulley 206 has a larger contact area and can receive a greater radial load as compared to the case of forming spline teeth. Since the inner circumferential surface 256 of the cylindrical portion 260 and the outer circumferential surface 258 of the output shaft 208 are brought into contact with each other, the seal portion 261 of the secondary pulley 210 has a larger contact area and can receive a greater radial load as compared to the case of forming spline teeth. Therefore, the load acting on the seal portions 240 and 261 can be received without extending the lengths of the seal portions 240 and 261 in the axial direction for ensuring the contact areas.

Since a stepped portion etc., are not formed on the input shaft 204 in the range of sliding of the cylindrical portion 236, the length in the axial direction of the seal portion 240, i.e., the seal width, of the primary pulley 206 does not change regardless of a change in the position of the primary movable sheave 214 in the axial direction. Therefore, a leakage amount of the operating oil from the seal portion 240 is a leakage amount corresponding to an oil pressure of the oil pressure chamber 84 of the primary hydraulic actuator 216, and the controllability of the hydraulic control can be improved by predicting the leakage amount based on the oil pressure. Similarly, since a stepped portion etc., are not formed on the output shaft 208 in the range of sliding of the cylindrical portion 261, the length in the axial direction of the seal portion 261, i.e., the seal width, of the secondary pulley 210 does not change regardless of a change in the position of the secondary movable sheave 224 in the axial direction. Therefore, a leakage amount of the operating oil from the seal portion 261 is a leakage amount corresponding to an oil pressure of the oil pressure chamber 108 of the secondary hydraulic actuator 226, and the controllability of the hydraulic control can be improved by predicting the leakage amount depending on the oil pressure.

Since the positioning structures at the times of the minimum gear ratio γmin and the maximum gear ratio γmax of the belt-type continuously variable transmission 202 are set on the side of the secondary pulley 210 in this embodiment, the positioning structures are not disposed in the primary pulley 206. Therefore, as depicted in FIG. 7, the input shaft 204 has a constant shaft diameter in the range of sliding of the primary movable sheave 214 in the axial direction except the range with the male spline 234 formed. This prevents the reduction in shaft diameter of the input shaft 204 and the deterioration of the strength of the input shaft 204 due to the formation of a stepped portion etc. Alternatively, the input shaft 204 is prevented from radially increasing in size due to the shaft diameter of the input shaft 204 increased by the disposition of the stepped portion etc.

As described above, according to this embodiment, the secondary pulley 210 is disposed with the cylinder member 228 for preventing the movement of the secondary movable sheave 224 and defining the maximum groove width Wmax of the second pulley groove 65 and is disposed with the stepped portions 262 and 264 on the outer circumferential surface 258 of the output shaft 208 and the inner circumferential surface of the secondary movable sheave 224, respectively, to define the minimum groove width Wmin of the second pulley groove 65 at the position of the abutment between the end surface 263 of the stepped portion 262 of the secondary movable sheave 224 and the end surface 266 of the stepped portion 264 of the output shaft 208. This eliminates the need for disposing a mechanical mechanism defining the minimum groove width Wmin and the maximum groove width Wmax of the first pulley groove 64 in the primary pulley 206 and, for example, the provision of a stepped portion for defining the minimum groove width Wmin of the first pulley groove 64 can be avoided on the input shaft 204.

This embodiment has a structure in which the movement of the secondary movable sheave 224 to the side opposite to the secondary fixed sheave 222 in the axial direction is prevented by the abutment between the end surface 268 of the secondary movable sheave 224 on the side opposite to the secondary fixed sheave 222 in the axial direction and the inner circumferential wall portion 228a of the cylinder member 228. As a result, when the end surface 268 of the secondary movable sheave 224 formed on the side opposite to the secondary fixed sheave 222 abuts on the inner circumferential wall portion 228a, the secondary movable sheave 224 is prevented from further moving in the axial direction and, therefore, the maximum groove width Wmax of the second pulley groove 65 is defined.

THIRD EMBODIMENT

Figure 9:
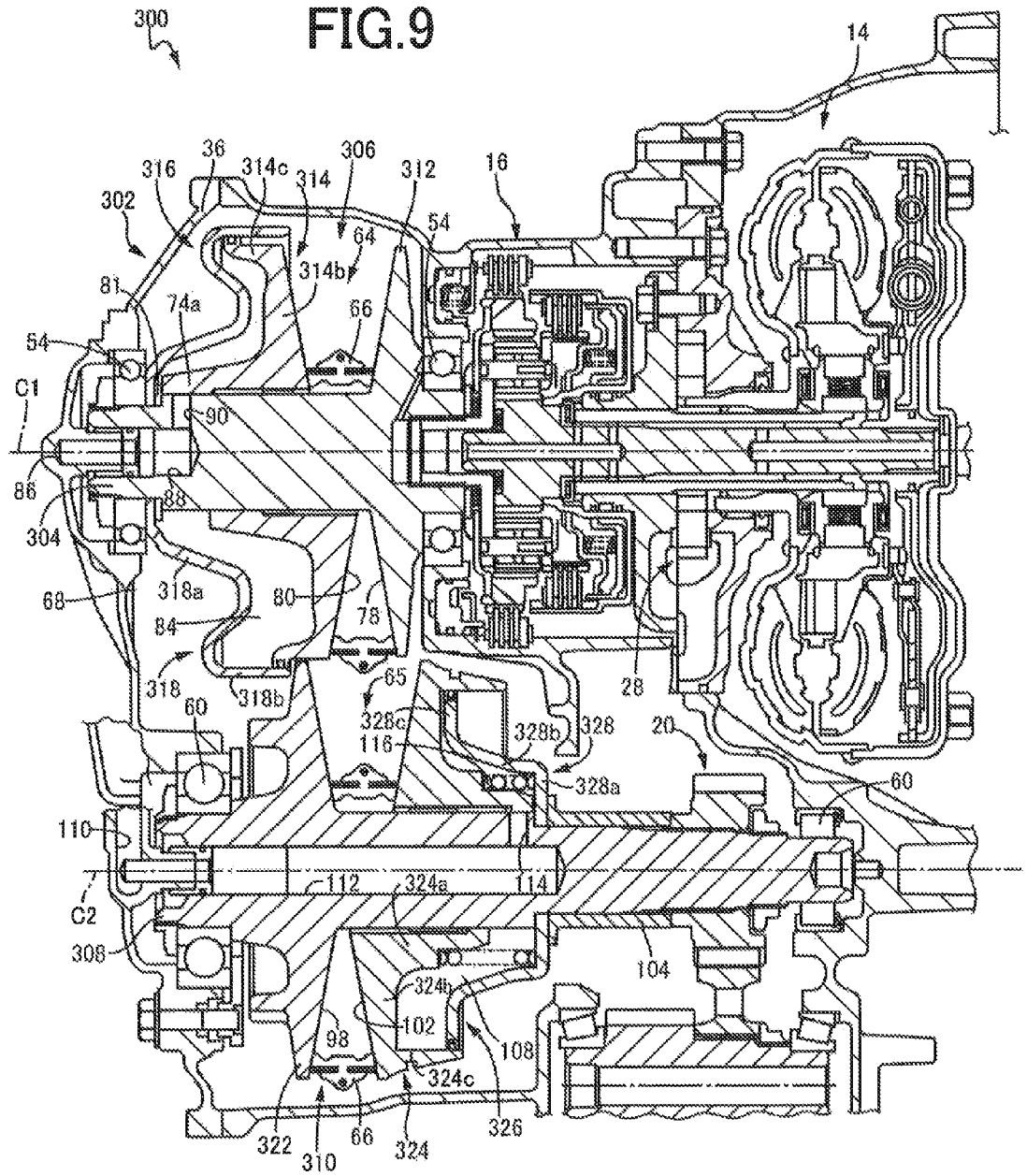
FIG. 9 is a cross-sectional view of a portion of a vehicle power transmission device that is another embodiment of the present invention, corresponding to FIGS. 2 and 6.

FIG. 9 is a cross-sectional view of a portion of a vehicle power transmission device 300 that is another embodiment of the present invention, corresponding to FIGS. 2 and 6. The vehicle power transmission device 300 of this embodiment includes a belt-type continuously variable transmission 302. The belt-type continuously variable transmission 302 includes an input shaft 304 supported rotatably around the axial center C1 via a pair of the bearings 54 by the transaxle case 36, a primary pulley (input-side groove width variable pulley) 306 disposed on the outer circumferential side of the input shaft 304, an output shaft 308 disposed in parallel with the input shaft 304 and supported rotatably around the axial center C2 via a pair of the bearings 60 by the transaxle case 36, a secondary pulley 310 (output-side groove width variable pulley) disposed on the outer circumferential side of the output shaft 308, and the endless annular transmission belt wound around each of the primary pulley 306 and the secondary pulley 310 to transmit power through a frictional force between the both pulleys.

The primary pulley 306 includes a disc-shaped primary fixed sheave 312 (first fixed sheave) fixed to the outer circumferential side of the input shaft 304, a primary movable sheave 314 (first movable sheave) disposed relatively non-rotatably and relatively movably in the axial direction on the input shaft 304 so as to form the first pulley groove 64 with the primary fixed sheave 312, and a primary hydraulic actuator 316 making the primary movable sheave 314 and the primary fixed sheave 312 closer to or further from each other depending on a supplied oil pressure so as to change the groove width of the first pulley groove.

The primary fixed sheave 312 is a disc-shaped member integrally disposed on the input shaft 304 and projecting outward from an outer circumferential surface of the input shaft 304. The primary fixed sheave 312 has the conical taper surface 78 formed on a surface facing the primary movable sheave 314 with a distance from the primary movable sheave 314 increasing toward the outer circumferential side.

The primary movable sheave 314 has an inner cylindrical portion 314a spline-fitted relatively movably in the axial direction and relatively non-rotatably around the axial center C1 to the input shaft 304, a disc portion 314b integrally disposed on and projecting outward from one end portion of the inner cylindrical portion 314a on the side of the primary fixed sheave 312, and an outer cylindrical portion 314c projected in the axial direction from an outer circumferential portion of the disc portion 314b toward the side opposite to the primary fixed sheave 312. The disc portion 314b has the conical taper surface 80 formed on a surface facing the primary fixed sheave 312 with a distance from the primary fixed sheave 312 increasing toward the outer circumferential side.

The taper surface 80 forms the first pulley groove 64 with the taper surface 78 of the primary fixed sheave 312.

The primary hydraulic actuator 316 includes a bottomed-cylindrical cylinder member 318 disposed at one end portion of the input shaft 304 on the side opposite to the primary fixed sheave 312 relative to the primary movable sheave 314 for forming the oil-tight oil pressure chamber 84 with the primary movable sheave 314. The cylinder member 318 includes a folded wall portion 318a prevented from moving in the axial direction because an inner circumferential portion thereof is sandwiched between the spacer 81 fitted to a stepped end surface formed on the input shaft 304 and the bearings 54, and a cylindrical portion 318b that is projected circumferentially continuously from an outer circumferential portion of the wall portion 318a to the outer circumferential side of the outer cylindrical portion 314c of the primary movable sheave 314 and that slides via an oil seal on an outer circumferential surface of the outer cylindrical portion 314c of the primary movable sheave 314. The oil pressure chamber 84 is formed in a space surrounded in an oil-tight manner by the cylinder member 318, the primary movable sheave 314, and the input shaft 304. The oil pressure chamber 84 is supplied with an oil pressure transferred from the oil pump 28 and appropriately adjusted by the hydraulic control circuit not depicted through each of the first oil passage 86 formed in the transaxle case 36, the second oil passage 88 formed on the inner circumferential side of the input shaft 304 in communication with the first oil passage 86, and the third oil passage 90 formed to radially penetrate the input shaft 304 from the second oil passage 88.

In the primary pulley 306, the primary movable sheave 314 moves closer to or away from the primary fixed sheave 312 in the axial direction depending on the oil pressure supplied to the oil pressure chamber 84 to change the width of the first pulley groove 64. In FIG. 9, the primary movable sheave 314 indicated by a solid line on the lower side relative to the axial center C1 represents the state in which the first pulley groove 64 formed with the primary fixed sheave 312 is set to the minimum groove width Wmin. In this state, the winding radius of the transmission belt 66 is maximized and the gear ratio γ of the belt-type continuously variable transmission 302 is set to the minimum gear ratio γmin. The primary movable sheave 314 indicated by a solid line on the upper side relative to the axial center C1 represents the state in which the first pulley groove 64 formed with the primary fixed sheave 312 is set to the maximum groove width Wmax. In this state, the winding radius of the transmission belt 66 is minimized and the gear ratio γ of the belt-type continuously variable transmission 302 is set to the maximum gear ratio γmax.

The secondary pulley 310 includes a secondary fixed sheave 322 (second fixed sheave) fixed to the outer circumferential side of the output shaft 308, a secondary movable sheave 324 (second movable sheave) disposed relatively non-rotatably and relatively movably in the axial direction on the output shaft 308 so as to form the second pulley groove 65 with the secondary fixed sheave 322, and a secondary hydraulic actuator 326 moving the secondary movable sheave 324 in the axial direction depending on a supplied oil pressure and making the secondary movable sheave 324 and the secondary fixed sheave 322 closer to or further from each other so as to change the groove width of the second pulley groove 65.

The secondary fixed sheave 322 is a disc-shaped member integrally disposed on the output shaft 308 and projecting outward from the outer circumferential surface of the output shaft 308. The secondary fixed sheave 322 has the conical taper surface 98 formed on a surface facing the secondary movable sheave 324 with a distance from the secondary movable sheave 324 increasing toward the outer circumferential side.

The secondary movable sheave 324 has an inner cylindrical portion 324a spline-fitted relatively movably in the axial direction and relatively non-rotatably around the axial center C2 to the output shaft 308, a disc-shaped disc portion 324b integrally disposed on and projecting outward from one end portion of the inner cylindrical portion 324a on the side of the secondary fixed sheave 322, and an outer cylindrical portion 324c projected in the axial center C2 direction from an outer circumferential portion of the disc portion 324b toward the side opposite to the secondary fixed sheave 322. The disc portion 324b has the conical taper surface 102 formed on a surface facing the secondary fixed sheave 322 with a distance from the secondary fixed sheave 322 increasing toward the outer circumferential side. The taper surface 102 forms the second pulley groove 65 with the taper surface 98 of the secondary fixed sheave 322.

The secondary hydraulic actuator 326 includes a bottomed-cylindrical cylinder member 328 disposed at one end portion of the output shaft 308 on the side opposite to the secondary fixed sheave 322 relative to the secondary movable sheave 324 for forming the oil-tight oil pressure chamber 108 with the secondary movable sheave 324. The cylinder member 328 includes an inner circumferential wall portion 328a prevented from moving in the axial direction because an inner circumferential portion thereof is sandwiched between a stepped end surface formed on the output shaft 308 and the cylindrical member 104, a cylindrical portion 328b extended from an outer circumferential portion of the inner circumferential wall portion 328a toward the disc portion 324b of the secondary movable sheave 324, and an outer circumferential wall portion 328c that is projected circumferentially continuously outward from one end portion of the cylindrical portion 328b on the side of the secondary movable sheave 324 and that slides via an oil seal on an inner circumferential surface of the outer cylindrical portion 324c of the secondary movable sheave 324. The oil pressure chamber 108 is formed in a space surrounded in an oil-tight manner by the cylinder member 328, the secondary movable sheave 324, and the output shaft 308. The oil pressure chamber 108 is supplied with an oil pressure transferred from the oil pump 28 and appropriately adjusted by the hydraulic control circuit not depicted through each of the fourth oil passage 110 formed in the transaxle case 36, the fifth oil passage 112 formed on the inner circumferential side of the output shaft 308 in communication with the fourth oil passage 110, and the sixth oil passage 114 formed to radially penetrate the output shaft 308 from the fifth oil passage 112. The coil spring 116 biasing the secondary movable sheave 324 toward the secondary fixed sheave 322 is disposed between a stepped end surface formed on an outer circumferential surface of the inner cylindrical portion 324a of the secondary movable sheave 324 and the inner circumferential wall portion 328a of the cylinder member 328.

In the secondary pulley 310, a thrust force toward the secondary fixed sheave 322, i.e., a thrust force in the direction of clamping the transmission belt 66 is applied to the secondary movable sheave 324 depending on the oil pressure supplied to the oil pressure chamber 108. In FIG. 9, the secondary pulley 310 indicated by a solid line on the lower side relative to the axial center C1 represents the state in which the second pulley groove 65 formed between the secondary fixed sheave 322 and the secondary movable sheave 324 is set to the minimum groove width Wmin. In this state, the winding radius of the transmission belt 66 on the secondary pulley 310 is maximized and the gear ratio γ of the belt-type continuously variable transmission 302 is set to the maximum gear ratio γmax. The secondary pulley 310 indicated by a solid line on the upper side relative to the axial center C1 represents the state in which the second pulley groove 65 formed between the secondary fixed sheave 322 and the secondary movable sheave 324 is set to the maximum width. In this state, the winding radius of the transmission belt 66 on the secondary pulley 310 is minimized and the belt-type continuously variable transmission 302 achieves the minimum gear ratio γmin.

FIG. 10 is an enlarged cross-sectional view of the vicinity of a spline-fitting portion of the primary movable sheave 314 enlarged for explaining a spline structure of the primary pulley 306 of FIG. 9. As depicted in FIG. 10, a female spline 330 is formed in parallel with the axial center C1 on an inner circumferential surface of the primary movable sheave 314 on the side of the transmission belt 66 in the axial direction. This female spline 330 is spline-fitted to a male spline 334 formed on an outer circumferential surface 332 of the input shaft 304 and the primary movable sheave 314 is integrally rotated with the input shaft 304.

On the side of the bearing 54 in the axial direction of the primary movable sheave 314, i.e., on the side opposite to the transmission belt 66, a cylindrical portion 338 (first cylindrical portion) is formed that has an inner circumferential surface 336 in sliding contact with the outer circumferential surface 332 of the input shaft 304, and the inner circumferential surface 336 of the cylindrical portion 338 and the outer circumferential surface 332 of the input shaft 304 are brought into sliding contact with each other without a gap to form a seal portion 340. In the seal portion 340, the leakage of operating oil supplied to the oil pressure chamber 84 of the primary hydraulic actuator 316 is suppressed by the metal contact between the inner circumferential surface 336 of the cylindrical portion 338 and the outer circumferential surface 332 of the input shaft 304 without a gap.

FIG. 11 is an enlarged cross-sectional view of the vicinity of a spline-fitting portion of the secondary movable sheave 324 enlarged for explaining a spline structure of the secondary pulley 310 of FIG. 9. In FIG. 11, a female spline 350 is formed in parallel with the axial center C2 on an inner circumferential surface of the secondary movable sheave 324 on the side of the transmission belt 66 in the axial direction. This female spline 350 is spline-fitted to a male spline 352 formed on an outer circumferential surface 358 of the output shaft 308 and the secondary movable sheave 324 is integrally rotated with the output shaft 308.

On the side of the cylinder member 328 in the axial direction of the secondary movable sheave 324, i.e., on the side opposite to the transmission belt 66 in the axial direction, a cylindrical portion 360 (second cylindrical portion) is formed that has an inner circumferential surface 356 in sliding contact with the outer circumferential surface 358 of the output shaft 308, and the inner circumferential surface 356 of the cylindrical portion 360 and the outer circumferential surface 358 of the output shaft 308 are brought into metal contact with each other without a gap to form a seal portion 361. The seal portion 361 suppresses the leakage of the operating oil supplied to the oil pressure chamber 108 of the secondary hydraulic actuator 326.

In this embodiment, the maximum groove width Wmax of the first pulley groove 64 is defined in the primary pulley 306 of the belt-type continuously variable transmission 302, and the minimum groove width Wmin of the second pulley groove is defined in the secondary pulley 310. Specifically, the state of the first pulley groove 64 at the maximum groove width Wmax is a state depicted on the upper side relative to the axial center C1 in FIG. 9, and an end surface 362 of the primary movable sheave 314 on the side of the cylinder member 318 is caused to abut on the end surface of the spacer 81 to prevent the movement of the primary movable sheave 314 toward the cylinder member 318 (the side opposite to the primary fixed sheave 312). In this case, the first pulley groove 64 is defined at the maximum groove width Wmax. In this state, the winding radius of the transmission belt 66 on the primary pulley 306 is minimized and the gear ratio γ of the belt-type continuously variable transmission 302 is set to the maximum gear ratio γmax. The spacer 81 corresponds to the predetermined member abutting on an end surface of the first movable sheave on the side opposite to the first fixed sheave in the axial direction of the present invention, and the end surface 362 of the primary movable sheave 314 and the end surface of the spacer 81 make up the first groove width defining portion of the present invention.

On the other hand, the state of the second pulley groove at the maximum groove width Wmax is a state depicted on the upper side relative to the axial center C2 in FIG. 9, and an end surface 364 of the secondary movable sheave 324 on the side of the cylinder member 328 (the side opposite to the secondary fixed sheave 322) is caused to abut on an end surface of the inner circumferential wall portion 328a of the cylinder member 328 to prevent the movement of the secondary movable sheave 324 toward the cylinder member 328 (the side opposite to the secondary fixed sheave 322). In this case, the second pulley groove is defined at the maximum groove width Wmax. In this state, the winding radius of the transmission belt 66 on the secondary pulley is minimized and the gear ratio γ of the belt-type continuously variable transmission 302 is set to the minimum gear ratio γmin. As described above, in this embodiment, the position of the primary movable sheave 314 achieving the maximum gear ratio γmax of the belt-type continuously variable transmission 302 is defined in the primary pulley 306, and the position of the secondary movable sheave 324 achieving the minimum gear ratio γmin of the belt-type continuously variable transmission 302 is defined in the secondary pulley 310. When the first pulley groove 64 is set to the maximum groove width Wmax, the groove width of the second pulley groove 65 is defined at the minimum groove width Wmin in the secondary pulley 310 in accordance with a change in the winding radius of the transmission belt 66. On the other hand, when the second pulley groove 65 is set to the maximum groove width Wmax, the groove width of the first pulley groove 64 is defined at the minimum groove width Wmin in the primary pulley 306 in accordance with a change in the winding radius of the transmission belt 66. As described above, the minimum groove width Wmin of the first pulley groove 64 and the minimum groove width Wmin of the second pulley groove 65 are defined. The inner circumferential wall portion 328a corresponds to the predetermined member abutting on an end surface of the second movable sheave on the side opposite to the second fixed sheave in the axial direction of the present invention, and the end surface 364 of the secondary movable sheave 324 and the end surface of the inner circumferential wall portion 328a make up the second groove width defining portion.

In the belt-type continuously variable transmission 302 configured as described above, when the transmission belt 66 is clamped, a reaction load, i.e., a radial load significantly acts on the seal portion 340 of the primary movable sheave 314 and the seal portion 361 of the secondary movable sheave 324 as is the case with the embodiment. In this regard, since the inner circumferential surface 336 of the cylindrical portion 338 and the outer circumferential surface 332 of the input shaft 304 are brought into contact with each other, the seal portion 340 of the primary pulley 306 has a larger contact area and can receive a greater radial load as compared to the case of forming spline teeth on the cylindrical portion 338, for example. Since the inner circumferential surface 356 of the cylindrical portion 360 and the outer circumferential surface 358 of the output shaft 308 are brought into contact with each other, the seal portion 361 of the secondary pulley 310 has a larger contact area and can receive a greater radial load as compared to the case of forming spline teeth. Therefore, the load acting on the seal portions 340 and 361 can be received without extending the lengths of the seal portions 340 and 361 in the axial direction for ensuring the contact areas.

Since a stepped portion etc., are not formed on the input shaft 304 in the range of sliding of the cylindrical portion 336, the length in the axial direction of the seal portion 340, i.e., the seal width, of the primary pulley 306 does not change regardless of a change in the position of the primary movable sheave 314 in the axial direction. Therefore, a leakage amount of the operating oil from the seal portion 340 is a leakage amount corresponding to an oil pressure of the oil pressure chamber 84 of the primary hydraulic actuator 316, and the controllability of the primary pulley 306 can be improved by predicting the leakage amount based on the oil pressure. Similarly, since a stepped portion etc., are not formed on the output shaft 308 in the range of sliding of the cylindrical portion 361, the length in the axial direction of the seal portion 361, i.e., the seal width, of the secondary pulley 310 does not change regardless of a change in the position of the secondary movable sheave 324 in the axial direction. Therefore, a leakage amount of the operating oil from the seal portion 361 is a leakage amount corresponding to an oil pressure of the oil pressure chamber 108 of the secondary hydraulic actuator 326, and the controllability of the secondary pulley 310 can be improved by predicting the leakage amount depending on the oil pressure.

In this embodiment, in the primary pulley 306, the shaft diameter of the input shaft 304 is made constant in the range of sliding of the cylindrical portion 338 in the axial direction except the site with the male spline 334 formed. This prevents the thinning of the input shaft 304 and the deterioration of the strength of the input shaft 304 due to the formation of a stepped portion etc. Alternatively, the input shaft 304 is prevented from increasing in shaft diameter only in a stepped portion due to the formation of the stepped portion etc. In the secondary pulley 310, the shaft diameter of the output shaft 308 is made constant in the range of sliding of the cylindrical portion 360 in the axial direction. This prevents the thinning of the output shaft 308 and the deterioration of the strength of the output shaft 308 due to the formation of a stepped portion etc. Alternatively, the output shaft 308 is prevented from increasing in shaft diameter due to the formation of the stepped portion etc., by the size of the formed stepped portion.

As described above, according to this embodiment, the primary pulley 306 is disposed with the spacer 81 defining the maximum groove width Wmax of the first pulley groove and the second pulley 310 is disposed with the inner circumferential wall portion 328a of the cylinder member 328 defining the maximum groove width Wmax of the second pulley groove. This eliminates the need for disposing a stepped portion for defining the minimum groove width Wmin of the first pulley groove 64 of the primary pulley 306 and a stepped portion for defining the minimum groove width Wmin of the second pulley groove 65 of the secondary pulley 310 and, therefore, for example, the provision of stepped portions for defining the minimum groove widths Wmin of the respective pulley grooves can be avoided on the input shaft 304 and the output shaft 308.

FOURTH EMBODIMENT

Figure 12:
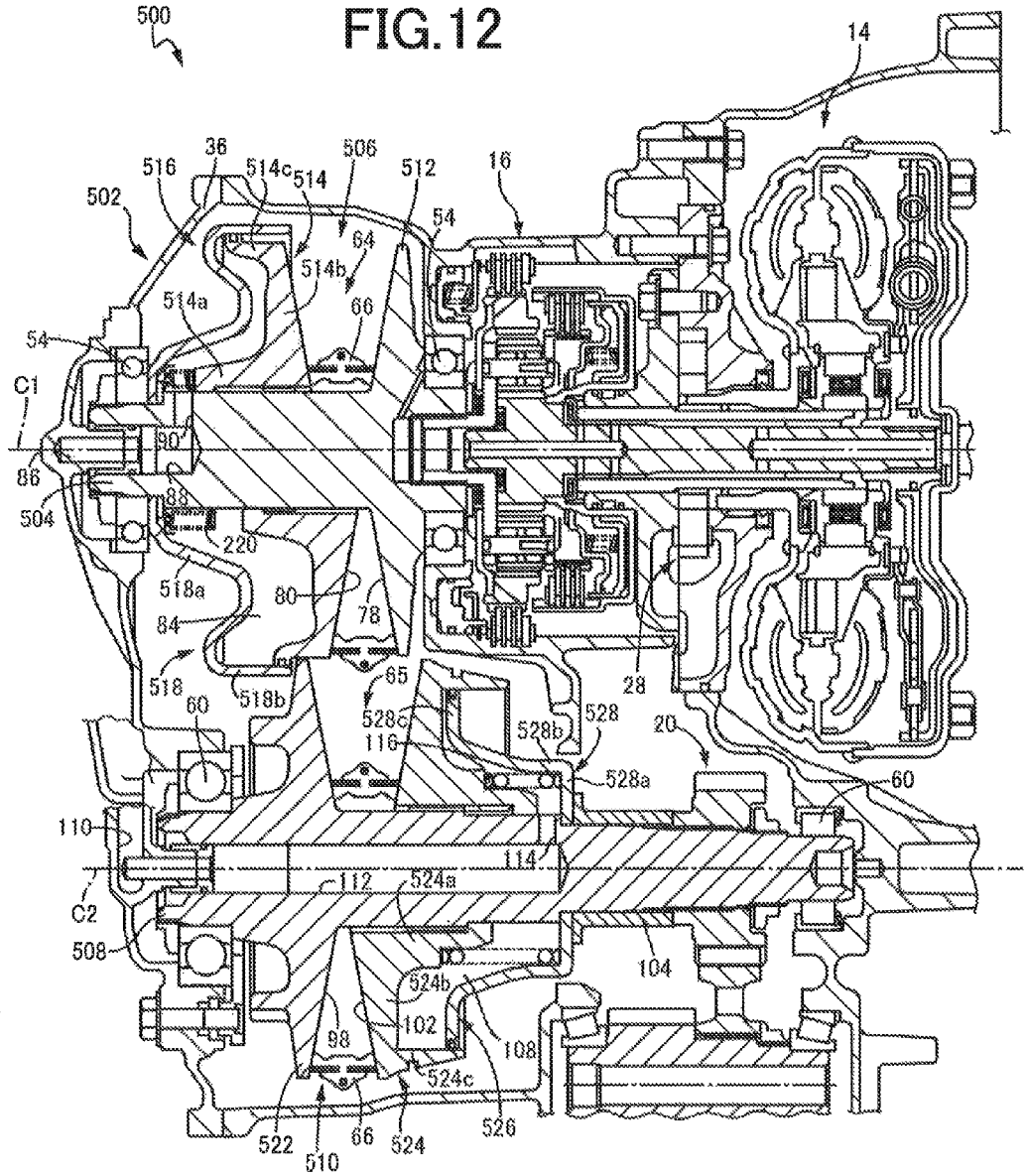
FIG. 12 is a cross-sectional view of a portion of a vehicle power transmission device that is another embodiment of the present invention, corresponding to FIG. 2 etc.

FIG. 12 is a cross-sectional view of a portion of a vehicle power transmission device 500 that is another embodiment of the present invention, corresponding to FIG. 2 etc. The vehicle power transmission device 500 of this embodiment includes a belt-type continuously variable transmission 502. The belt-type continuously variable transmission 502 includes an input shaft 504 supported rotatably around the axial center C1 via a pair of the bearings 54 by the transaxle case 36, a primary pulley (input-side groove width variable pulley) 506 disposed on the outer circumferential side of the input shaft 504, an output shaft 508 disposed in parallel with the input shaft 504 and supported rotatably around the axial center C2 via a pair of the bearings 60 by the transaxle case 36, a secondary pulley (output-side groove width variable pulley) 510 disposed on the outer circumferential side of the output shaft 508, and the well-known endless annular transmission belt 66 wound around each of the primary pulley 506 and the secondary pulley 510 to transmit power through a frictional force between the both pulleys.

The primary pulley 506 includes a disc-shaped primary fixed sheave 512 (first fixed sheave) fixed to the outer circumferential side of the input shaft 504, a primary movable sheave 514 (first movable sheave) disposed relatively non-rotatably and relatively movably in the axial direction on the input shaft 504 so as to form the first pulley groove 64 with the primary fixed sheave 512, and a primary hydraulic actuator 516 moving the primary movable sheave 514 in the axial center C1 direction depending on a supplied oil pressure and making the primary movable sheave 514 and the primary fixed sheave 512 closer to or further from each other so as to change the groove width of the first pulley groove 64.

The primary fixed sheave 512 is a disc-shaped member integrally disposed on the input shaft 504 and projecting outward from an outer circumferential surface of the input shaft 504. The primary fixed sheave 512 has the conical taper surface 78 formed on a surface facing the primary movable sheave 514 with a distance from the primary movable sheave 514 increasing toward the outer circumferential side.

The primary movable sheave 514 has an inner cylindrical portion 514a spline-fitted relatively movably in the axial direction and relatively non-rotatably around the axial center C1 to the input shaft 504, a disc portion 514b integrally disposed on and projecting outward from one end portion of the inner cylindrical portion 514a on the side of the primary fixed sheave 512, and an outer cylindrical portion 514c projected in the axial center C1 direction from an outer circumferential portion of the disc portion 514b toward the side opposite to the primary fixed sheave 514. The disc portion 514b has the conical taper surface 80 formed on a surface facing the primary fixed sheave 512 with a distance from the primary fixed sheave 512 increasing toward the outer circumferential side. The taper surface 80 forms the first pulley groove 64 with the taper surface 78 of the primary fixed sheave 512.

The primary hydraulic actuator 516 includes a bottomed-cylindrical cylinder member 518 disposed at one end portion of the input shaft 504 on the side opposite to the primary fixed sheave 512 relative to the primary movable sheave 514 for forming the oil-tight oil pressure chamber 84 with the primary movable sheave 514. The cylinder member 518 includes a folded wall portion 518a prevented from moving in the axial direction because an inner circumferential portion thereof is sandwiched between the spacer 81 fitted to a stepped end surface formed on the input shaft 504 and the bearings 54, and a cylindrical portion 518b that is projected circumferentially continuously from an outer circumferential portion of the wall portion 518a to the outer circumferential side of the outer cylindrical portion 514c of the primary movable sheave 514 and that slides via an oil seal on an outer circumferential surface of the outer cylindrical portion 514c of the primary movable sheave 514. The oil pressure chamber 84 is formed in a space surrounded in an oil-tight manner by the cylinder member 518, the primary movable sheave 514, and the input shaft 504. The oil pressure chamber 84 is supplied with an oil pressure transferred from the oil pump 28 and appropriately adjusted by the hydraulic control circuit not depicted through each of the first oil passage 86 formed in the transaxle case 36, the second oil passage 88 formed on the inner circumferential side of the input shaft 504 in communication with the first oil passage 86, and the third oil passage 90 formed to radially penetrate the input shaft 504 from the second oil passage 88.

In the primary pulley 506, the primary movable sheave 514 moves closer to or away from the primary fixed sheave 512 in the axial center C1 direction depending on the oil pressure supplied to the oil pressure chamber 84 to change the width of the first pulley groove 64. In FIG. 12, the primary movable sheave 514 indicated by a solid line on the lower side relative to the axial center C1 represents the state in which the first pulley groove 64 formed with the primary fixed sheave 512 is set to the minimum groove width Wmin. In this state, the winding radius of the transmission belt 66 is maximized and the gear ratio γ of the belt-type continuously variable transmission 502 is set to the minimum gear ratio γmin. The primary movable sheave 514 indicated by a solid line on the upper side relative to the axial center C1 represents the state in which the first pulley groove 64 formed with the primary fixed sheave 512 is set to the maximum groove width Wmax. In this state, the winding radius of the transmission belt 66 is minimized and the gear ratio γ of the belt-type continuously variable transmission 502 is set to the maximum gear ratio γmax.

The secondary pulley 510 includes a secondary fixed sheave 522 (second fixed sheave) fixed to the outer circumferential side of the output shaft 508, a secondary movable sheave 524 (second movable sheave) disposed relatively non-rotatably and relatively movably in the axial center C2 direction on the output shaft 508 so as to form the second pulley groove 65 with the secondary fixed sheave 522, and a secondary hydraulic actuator 526 moving the secondary movable sheave 524 in the axial direction depending on a supplied oil pressure and making the secondary movable sheave 524 and the secondary fixed sheave 522 closer to or further from each other so as to change the groove width of the second pulley groove 65.

The secondary fixed sheave 522 is a disc-shaped member integrally disposed on the output shaft 508 and projecting outward from the outer circumferential surface of the output shaft 508. The secondary fixed sheave 522 has the conical taper surface 98 formed on a surface facing the secondary movable sheave 524 with a distance from the secondary movable sheave 524 increasing toward the outer circumferential side.

The secondary movable sheave 524 has an inner cylindrical portion 524a spline-fitted relatively movably in the axial direction and relatively non-rotatably around the axial center C2 to the output shaft 508, a disc-shaped disc portion 524b integrally disposed on and projecting outward from one end portion of the inner cylindrical portion 524a on the side of the secondary fixed sheave 522, and an outer cylindrical portion 524c projected in the axial center C2 direction from an outer circumferential portion of the disc portion 524b toward the side opposite to the secondary fixed sheave 522. The disc portion 524b has the conical taper surface 102 formed on a surface facing the secondary fixed sheave 522 with a distance from the secondary fixed sheave 522 increasing toward the outer circumferential side. The taper surface 102 forms the second pulley groove 65 with the taper surface 98 of the secondary fixed sheave 522.

The secondary hydraulic actuator 526 includes a bottomed-cylindrical cylinder member 528 disposed at one end portion of the output shaft 508 on the side opposite to the secondary fixed sheave 522 relative to the secondary movable sheave 524 for forming the oil-tight oil pressure chamber 108 with the secondary movable sheave 524. The cylinder member 528 includes an inner circumferential wall portion 528a prevented from moving in the axial direction because an inner circumferential portion thereof is sandwiched between a stepped end surface formed on the output shaft 508 and the cylindrical member 104, a cylindrical portion 528b extended from an outer circumferential portion of the inner circumferential wall portion 528a toward the disc portion 524b of the secondary movable sheave 524, and an outer circumferential wall portion 528c that is projected circumferentially continuously outward from one end portion of the cylindrical portion 528b on the side of the secondary movable sheave 524 and that slides via an oil seal on an inner circumferential surface of the outer cylindrical portion 524c of the secondary movable sheave 524. The oil pressure chamber 108 is formed in a space surrounded in an oil-tight manner by the cylinder member 528, the secondary movable sheave 524, and the output shaft 508. The oil pressure chamber 108 is supplied with an oil pressure transferred from the oil pump 28 and appropriately adjusted by the hydraulic control circuit not depicted through each of the fourth oil passage 110 formed in the transaxle case 36, the fifth oil passage 112 formed on the inner circumferential side of the output shaft 508 in communication with the fourth oil passage 110, and the sixth oil passage 114 formed to radially penetrate the output shaft 508 from the fifth oil passage 112. The coil spring 116 biasing the secondary movable sheave 524 toward the secondary fixed sheave 522 is disposed between a stepped end surface formed on an outer circumferential surface of the inner cylindrical portion 524a of the secondary movable sheave 524 and the inner circumferential wall portion 528a of the cylinder member 528.

In the secondary pulley 510, a thrust force toward the secondary fixed sheave 522, i.e., a thrust force in the direction of clamping the transmission belt 66 is applied to the secondary movable sheave 524 depending on the oil pressure supplied to the oil pressure chamber 108. In FIG. 12, the secondary pulley 510 indicated by a solid line on the lower side relative to the axial center C1 represents the state in which the second pulley groove 65 formed between the secondary fixed sheave 522 and the secondary movable sheave 524 is set to the minimum groove width Wmin. In this state, the winding radius of the transmission belt 66 on the secondary pulley 510 is maximized and the gear ratio γ of the belt-type continuously variable transmission 502 is set to the maximum gear ratio γmax. The secondary pulley 510 indicated by a solid line on the upper side relative to the axial center C1 represents the state in which the second pulley groove 65 formed between the secondary fixed sheave 522 and the secondary movable sheave 524 is set to the maximum groove width Wmax. In this state, the winding radius of the transmission belt 66 on the secondary pulley 510 is minimized and the gear ratio γ of the belt-type continuously variable transmission 502 is set to the minimum gear ratio γmin.

Figure 13:
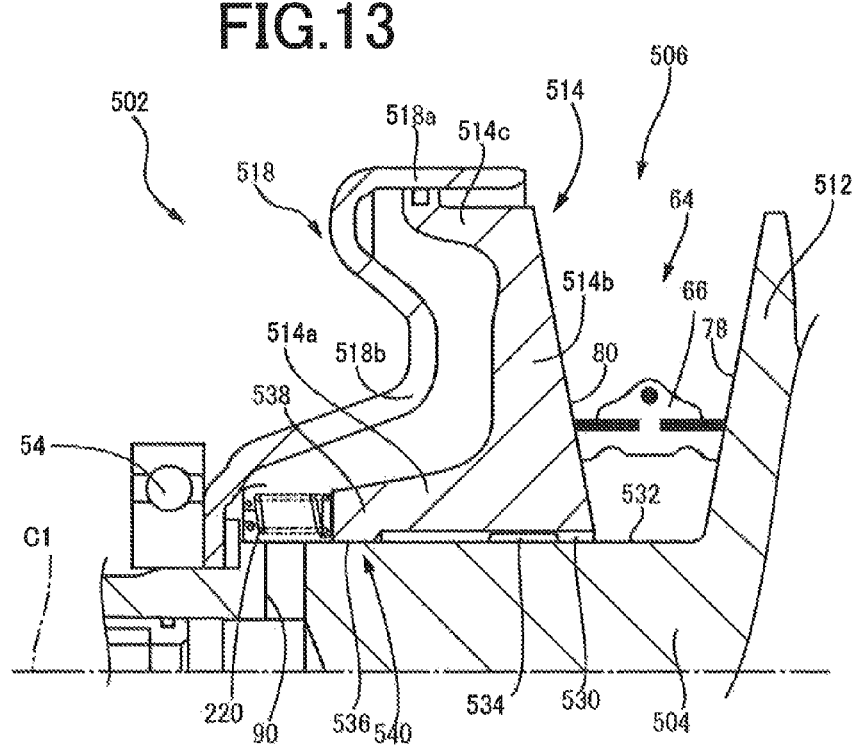
FIG. 13 is an enlarged cross-sectional view of the vicinity of a spline-fitting portion of the primary movable sheave enlarged for explaining a spline structure of the primary pulley of FIG. 12.

FIG. 13 is an enlarged cross-sectional view of the vicinity of a spline-fitting portion of the primary movable sheave 514 enlarged for explaining a spline structure of the primary pulley 506 of FIG. 12. As depicted in FIG. 13, a female spline 530 is formed in parallel with the axial center C1 on an inner circumferential portion of the primary movable sheave 514 on the side of the transmission belt 66 in the axial direction. This female spline 530 is spline-fitted to a male spline 534 formed on an outer circumferential surface 532 of the input shaft 504 and the primary movable sheave 514 is integrally rotated with the input shaft 504.

On the side of the bearing 54 in the axial direction of the primary movable sheave 514, i.e., on the side opposite to the transmission belt 66, a cylindrical portion 538 (first cylindrical portion) is formed that has an inner circumferential surface 536 in sliding contact with the outer circumferential surface 532 of the input shaft 504, and a seal portion 504 is formed such that the inner circumferential surface 536 of the cylindrical portion 538 and the outer circumferential surface 532 of the input shaft 504 are brought into sliding contact with each other without a gap. In the seal portion 540, the leakage of operating oil supplied to the oil pressure chamber 84 of the primary hydraulic actuator 516 is suppressed by the metal contact between the inner circumferential surface 536 of the cylindrical portion 538 and the outer circumferential surface 532 of the input shaft 504 without a gap.

Figure 14:
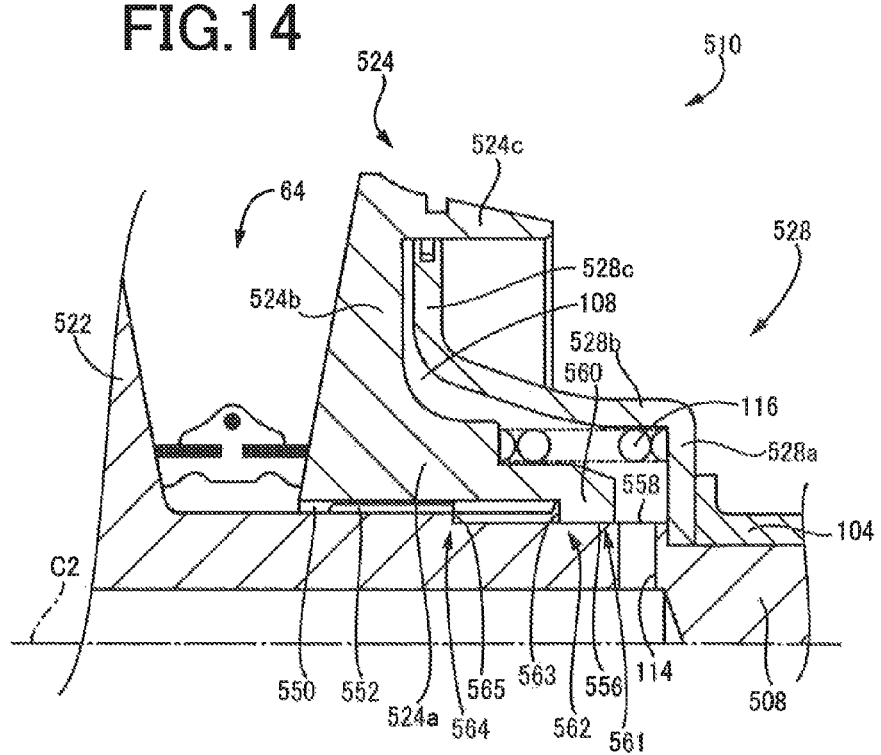
FIG. 14 is an enlarged cross-sectional view of the vicinity of a spline-fitting portion of the secondary movable sheave enlarged for explaining a spline structure of the secondary pulley of FIG. 12.

FIG. 14 is an enlarged cross-sectional view of the vicinity of a spline-fitting portion of the secondary movable sheave 524 enlarged for explaining a spline structure of the secondary pulley 510 of FIG. 12. In FIG. 14, a female spline 550 is formed in parallel with the axial center C2 on an inner circumferential surface of the secondary movable sheave 524 on the side of the transmission belt 66 in the axial direction. This female spline 550 is spline-fitted to a male spline 552 formed on an outer circumferential surface of the output shaft 508 and the secondary movable sheave 524 is integrally rotated with the output shaft 508.

On the side of the cylinder member 528 in the axial direction of the secondary movable sheave 524, i.e., on the side opposite to the transmission belt 66 in the axial direction, a cylindrical portion 560 (second cylindrical portion) is formed that has an inner circumferential surface 556 in sliding contact with the outer circumferential surface 558 of the output shaft 508, and the inner circumferential surface 556 of the cylindrical portion 560 and the outer circumferential surface 558 of the output shaft 508 are brought into metal contact with each other without a gap to form a seal portion 561 to suppress the leakage of the operating oil supplied to the oil pressure chamber 108 of the secondary hydraulic actuator 526.

A stepped portion 562 is formed on the boundary between the female spline 550 of the secondary movable sheave 524 and the cylindrical portion 560. A stepped portion 564 is also formed in the vicinity of the male spline 552 of the output shaft 508, and an end surface 563 of the stepped portion 562 and an end surface 565 of the stepped portion 564 abut on each other to define the position of the secondary movable sheave 524 achieving the maximum gear ratio γmax of the belt-type continuously variable transmission 502. Specifically, the state depicted on the lower side relative to the axial center C2 in FIG. 12 is achieved and the end surface 563 of the stepped portion 562 of the secondary movable sheave 524 and the end surface 565 of the stepped portion 564 of the output shaft 508 abut on each other to prevent the movement of the secondary movable sheave 524 toward the secondary fixed sheave 522. In this state, the second pulley groove 65 is defined at the minimum groove width Wmin and the belt-type continuously variable transmission 502 achieves the maximum gear ratio γmax.

In this embodiment, the positioning of the minimum gear ratio γmin of the belt-type continuously variable transmission 502 is performed through the hydraulic control. Specifically, oil pressures supplied to the oil pressure chamber 84 of the primary pulley 506 and the oil pressure chamber 108 of the secondary pulley 510 are controlled to preset oil pressures to define the maximum groove width Wmax of the second pulley groove 65 in the secondary pulley 510 and to achieve the minimum gear ratio γmin of the belt-type continuously variable transmission 502. As described above, the maximum groove width Wmax of the second pulley groove 65 of the secondary pulley 510 can be defined through the hydraulic control. In this embodiment, a portion of defining the maximum groove width Wmax of the second pulley groove 65 through the hydraulic control corresponds to the second groove width defining portion of the present invention.

The belt-type continuously variable transmission 502 configured as described above can also acquire the same effect as the embodiments. Although the maximum groove width Wmax of the secondary pulley 510 is defined through the hydraulic control in this embodiment, the maximum groove width Wmax of the first pulley groove 64 of the primary pulley 506 may be defined through the hydraulic control.

FIFTH EMBODIMENT

Figure 15:
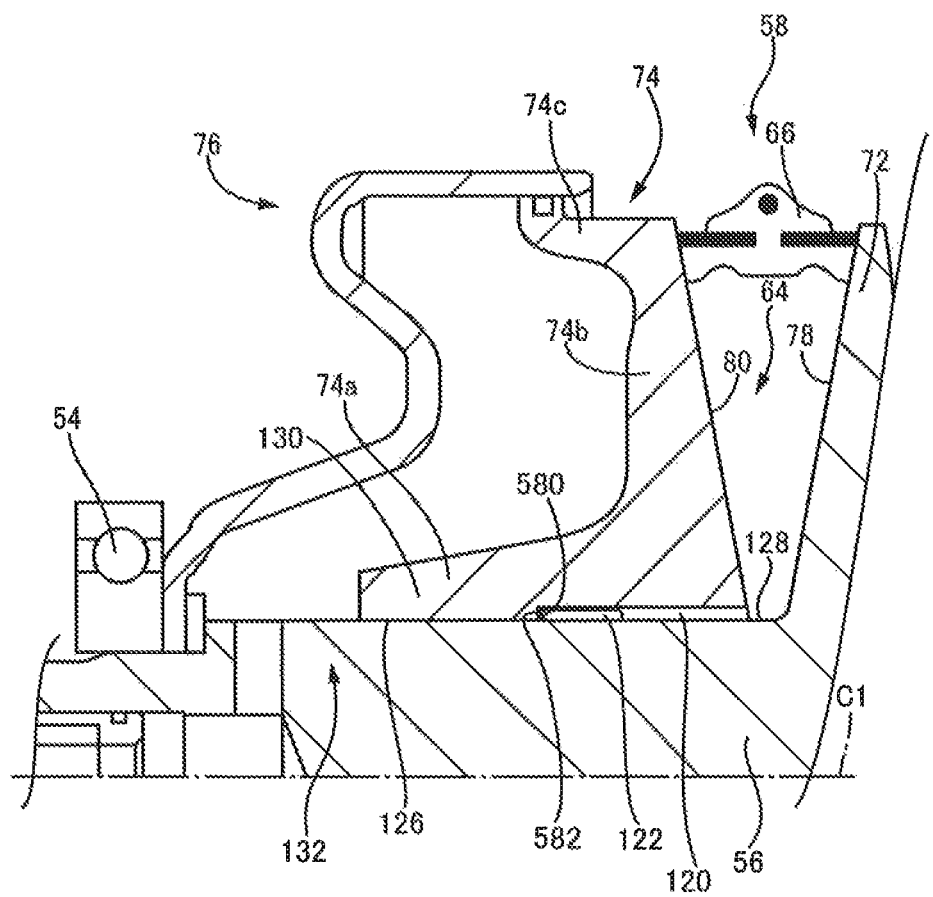
FIG. 15 is an enlarged cross-sectional view of the vicinity of a spline-fitting portion of the primary movable sheave enlarged for explaining a spline structure of the primary pulley that is another embodiment of the present invention.
Figure 16:
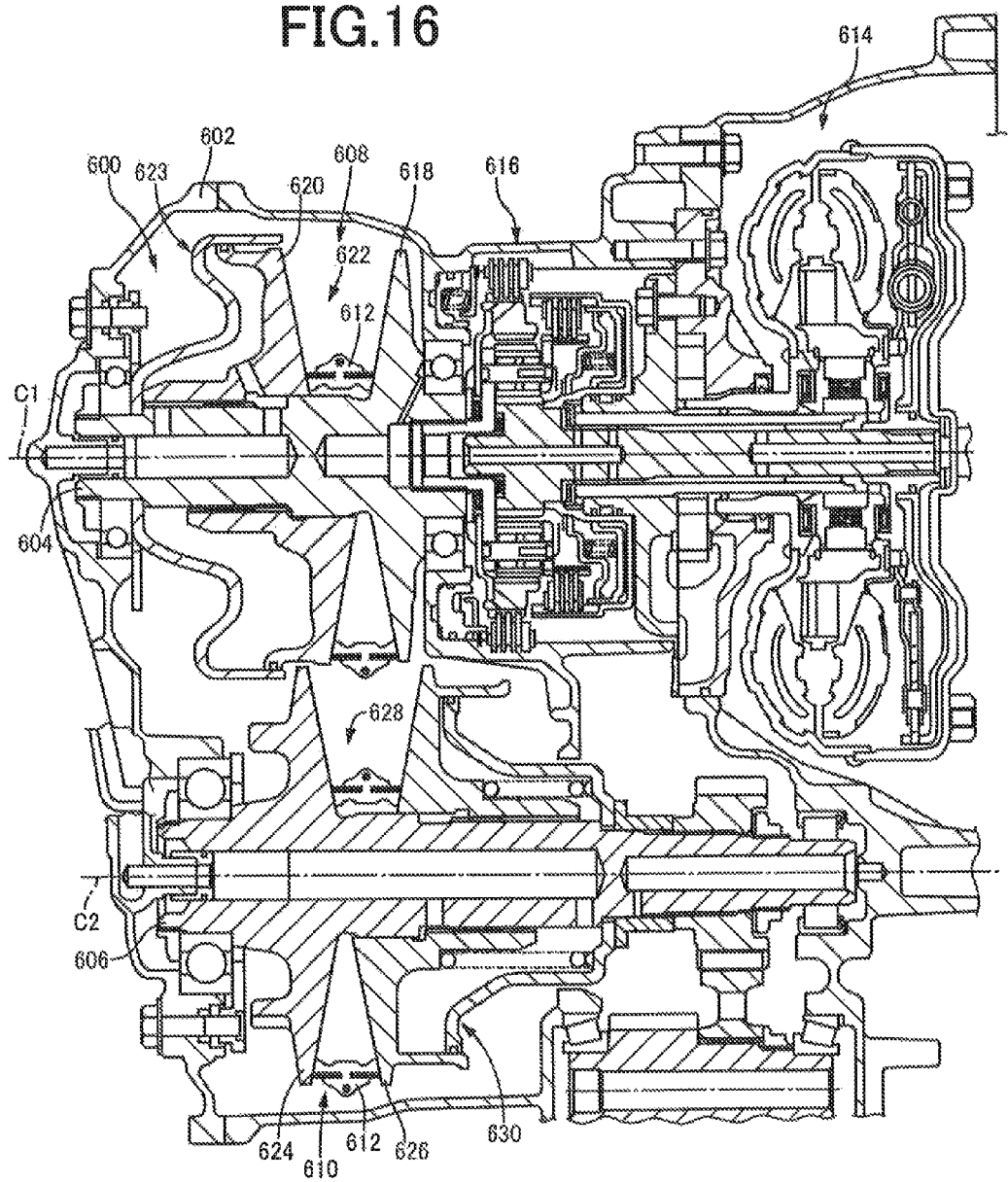
FIG. 16 is a cross-sectional view for explaining the conventional structure of a belt-type continuously variable transmission.
Figure 17:
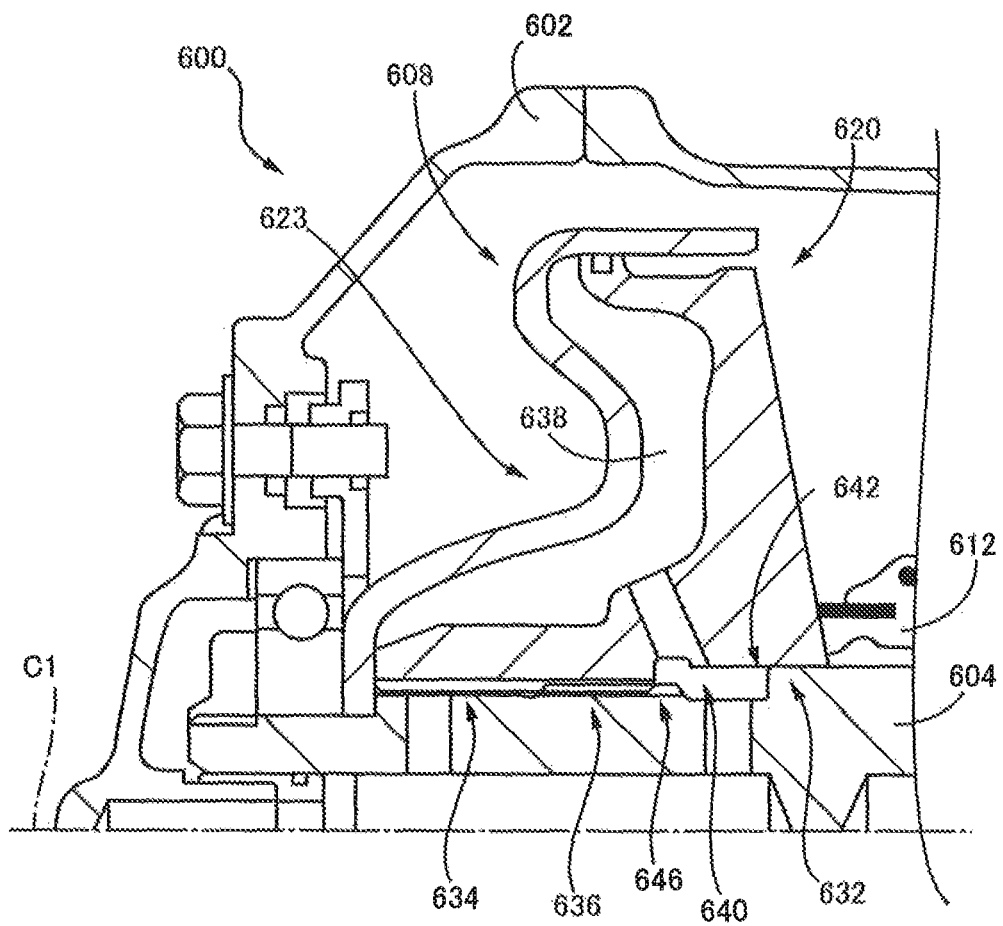
FIG. 17 is an enlarged cross-sectional view of the vicinity of the input shaft and the movable sheave enlarged in the primary pulley of FIG. 16.

Although the position of the minimum groove width Wmin of the first pulley groove 64 is defined at the position of the abutment between the stepped end surface 134 formed on the primary movable sheave 74 and the stepped end surface 136 formed on the input shaft 56 in the primary pulley 58 depicted in FIG. 3, the position of the minimum groove width Wmin of the first pulley groove 64 may be defined at the position of the abutment between an end surface 580 of the female spline 120 formed on the primary movable sheave 74 and an end surface 582 of the male spline 122 formed on the input shaft 56 as depicted in FIG. 15. The end surface 580 of the primary movable sheave 74 is an end surface formed on the boundary between the female spline 120 of the primary movable sheave 74 and the cylindrical portion 130. The end surface 582 of the input shaft 56 is an end surface of the male spline 122 formed on the input shaft 56 on the side opposite to the transmission belt 66 (on the side of the bearing 54). When the end surface 580 of the primary movable sheave abuts on the end surface 582 of the male spline 122 of the input shaft 56, the primary movable sheave 74 is prevented from moving toward the primary fixed sheave 72. This position is defined as the position of the minimum groove width Wmin of the first pulley groove 64 of the primary pulley 58. The belt-type continuously variable transmission 18 is set to achieve the minimum gear ratio γmin in this state. The end surface 580 and the end surface 582 are formed perpendicularly to the shaft center C1 so as not to climb over each other. The radial heights of the end surface 580 and the end surface 582 are also designed with dimensions preventing the end surfaces from climbing over each other.

This eliminates the need for disposing a stepped portion in the primary movable sheave 74 and the input shaft 56 for defining the minimum groove width Wmin of the first pulley groove 64 of the primary pulley 58 and, particularly, can prevent the deterioration of the strength of the input shaft 56 and the increase in shaft diameter due to the provision of the stepped portion. As a result, the stepped portions can be eliminated in both the primary pulley 58 and the secondary pulley 62. If the stepped portions are formed, a gap between the primary movable sheave 74 and the input shaft 56 is formed between the stepped portion 134 and the stepped portion 136 depicted in FIG. 3, for example, and a site is formed that does not receive the radial load generated when the transmission belt 66 is clamped; however, in this embodiment, since the primary movable sheave 74 and the input shaft 56 come into contact with each other in the entire portion in the axial direction, a wasted site receiving no radial load is not formed. Therefore, since an area accepting the radial load increases, the primary pulley 58 is prevented from being extended in the axial direction for ensuring the area.

The configuration is applicable not only to the primary pulley 58 but also to the secondary pulley. For example, in the secondary pulley 310 of FIG. 11, the end surface formed between the female spline 350 of the secondary movable sheave 324 and the cylindrical portion 360 is configured to abut on the end surface of the male spline 352 of the output shaft 308 on the side of the cylinder member 328 in the axial direction and the position of the abutment is defined as the minimum groove width Wmin of the second pulley groove 65. In this configuration, the minimum groove width Wmin of the second pulley groove 65 can be defined without disposing a stepped portion etc., in the secondary pulley. As a result, the stepped portions can be eliminated in both the primary pulley and the secondary pulley. Also in this case, the end surfaces are formed perpendicularly to the shaft center C2 so as not to climb over each other and the radial heights of the end surfaces are designed with dimensions preventing the end surfaces from climbing over each other.

As described above, according to this embodiment, a configuration can be implemented such that when the primary movable sheave 74 moves closer to the primary fixed sheave 72, the minimum groove width Wmin of the first pulley groove is defined at the position at which the end surface 580 formed on the boundary between the female spline 120 formed on the inner circumferential portion of the primary movable sheave 74 and the cylindrical portion 130 abuts on the end surface 582 of the male spline 122 formed on the input shaft 56. As a result, since the minimum groove width Wmin of the first pulley groove 64 is defined at the position of abutment between the end surface 580 formed on the primary movable sheave 74 and the end surface 582 formed on the male spline 122 of the input shaft 56, the minimum groove width Wmin of the first pulley groove 64 can be defined without disposing a stepped portion on the input shaft 56 and the primary movable sheave 74.

According to this embodiment, a configuration can be implemented such that when the secondary movable sheave 324 moves closer to the secondary fixed sheave 322, the minimum groove width Wmin of the second pulley groove 65 is defined at the position at which the end surface formed on the boundary between the female spline 350 formed on the inner circumferential portion of the secondary movable sheave 324 and the cylindrical portion 360 abuts on the end surface of the male spline 352 formed on the output shaft 308. As a result, since the minimum groove width Wmin of the second pulley groove 65 is defined at the position of abutment between the end surface formed on the secondary movable sheave 324 and the end surface formed on the male spline 352 of the output shaft 308, the minimum groove width Wmin of the second pulley groove can be defined without disposing a stepped portion on the output shaft 308 and the secondary movable sheave 324.

Although the embodiments of the present invention have been described in detail with reference to the drawings, the present invention is applied in other forms.

For example, although the maximum groove width Wmax of the second pulley groove 65 of the secondary pulley 510 is defined through the hydraulic control in the embodiments, for example, the maximum groove width Wmax of the first pulley groove 64 of the primary pulley 506 may be defined through the hydraulic control. Both the maximum groove width Wmax of the first pulley groove 64 and the maximum groove width Wmax of the second pulley groove 65 may hydraulically be controlled.

The described embodiments are merely exemplary embodiments and the present invention may be implemented in variously modified and improved forms based on the knowledge of those skilled in the art.

NOMENCLATURE OF ELEMENTS 18, 202, 302, 502: belt-type continuously variable transmission
40, 208, 308, 508: output shaft
56, 204, 304, 504: input shaft
64: first pulley groove
65: second pulley groove
66: transmission belt
72, 212, 312, 512: primary fixed sheave (first fixed sheave)
74, 214, 314, 514: primary movable sheave (first movable sheave)
81: spacer (first groove width defining portion, predetermined member)
92, 222, 322, 522: secondary fixed sheave (second fixed sheave)
94, 224, 324, 524: secondary movable sheave (second movable sheave)
120, 140, 230, 250, 330, 350, 530, 550: female spline
122, 142, 234: 252, 334, 352, 534, 552: male spline
130, 238, 338, 538: cylindrical portion (first cylindrical portion)
134, 136, 262, 264, 562, 564: stepped portion
150, 260, 360, 560: cylindrical portion (second cylindrical portion)
228a, 328a: inner circumferential wall portion (second groove width defining portion, predetermined member)

The invention claimed is:

1. A belt-type continuously variable transmission for a vehicle comprising: a primary pulley including a first fixed sheave fixed to an input shaft, and a first movable sheave relatively non-rotatable and relatively movable in axial direction to the input shaft due to spline-fitting of a female spline formed on an inner circumferential portion thereof to a male spline formed on the input shaft; a secondary pulley including a second fixed sheave fixed to an output shaft in parallel with the input shaft, and a second movable sheave relatively non-rotatable and relatively movable in the axial direction to the output shaft due to spline-fitting of a female spline formed on an inner circumferential portion thereof to a male spline formed on the output shaft; and a transmission belt wound around a V-shaped first pulley groove formed between the first fixed sheave and the first movable sheave and a V-shaped second pulley groove formed between the second fixed sheave and the second movable sheave, the female spline formed on the inner circumferential portion of the first movable sheave of the primary pulley being formed on the transmission belt side in the axial direction when the transmission belt is wound around the first pulley groove, the first movable sheave having a first cylindrical portion with cylindrical shape formed on the side opposite to the transmission belt side in the axial direction, the first cylindrical portion having an inner circumferential surface in sliding contact with an outer circumferential surface of the input shaft, the outer circumferential surface of the input shaft formed smoothly to be brought into entire contact with the inner circumferential surface of the first cylindrical portion in a range of sliding contact with the inner circumferential surface of the first cylindrical portion, the female spline formed on the inner circumferential portion of the second movable sheave of the secondary pulley being formed on the transmission belt side in the axial direction when the transmission belt is wound around the second pulley groove, the second movable sheave having a second cylindrical portion with cylindrical shape formed on the side opposite to the transmission belt side in the axial direction, the second cylindrical portion having an inner circumferential surface in sliding contact with an outer circumferential surface of the output shaft, the outer circumferential surface of the output shaft formed smoothly to be brought into entire contact with the inner circumferential surface of the second cylindrical portion in a range of sliding contact with the inner circumferential surface of the second cylindrical portion, the belt-type continuously variable transmission for a vehicle disposed with at least one of a first groove width defining portion disposed on the primary pulley for defining a maximum groove width of the first pulley groove and a second groove width defining portion disposed on the secondary pulley for defining a maximum groove width of the second pulley groove, wherein the first groove width defining portion is disposed on the primary pulley, and the output shaft having a uniform shaft diameter in a range of sliding of the second movable sheave in the axial direction except a site with the male spline formed, and wherein the second groove width defining portion is disposed on the secondary pulley, the input shaft having a uniform shaft diameter in a range of sliding of the first movable sheave in the axial direction except a site with the male spline formed.

2. The belt-type continuously variable transmission for a vehicle of claim 1, wherein when the first movable sheave moves closer to the first fixed sheave, a minimum groove width of the first pulley groove is defined at a position at which an end surface formed on a boundary between the female spline formed on the inner circumferential portion of the first movable sheave and the first cylindrical portion abuts on an end surface of the male spline formed on the input shaft.

3. The belt-type continuously variable transmission for a vehicle of claim 1, wherein when the second movable sheave moves closer to the second fixed sheave, a minimum groove width of the second pulley groove is defined at a position at which an end surface formed on a boundary between the female spline formed on the inner circumferential portion of the second movable sheave and the second cylindrical portion abuts on an end surface of the male spline formed on the output shaft.

4. The belt-type continuously variable transmission for a vehicle of claim 1, wherein the primary pulley is disposed with the first groove width defining portion defining the maximum groove width of the first pulley groove, wherein respective stepped portions are formed on an outer circumferential surface of the input shaft and an inner circumferential surface of the first movable sheave, and wherein a minimum groove width of the first pulley groove is defined at a position at which an end surface of the stepped portion of the first movable sheave abuts on an end surface of the stepped portion of the input shaft.

5. The belt-type continuously variable transmission for a vehicle of claim 1, wherein the secondary pulley is disposed with the second groove width defining portion defining the maximum groove width of the second pulley groove, wherein respective stepped portions are formed on an outer circumferential surface of the output shaft and an inner circumferential surface of the second movable sheave, and wherein a minimum groove width of the second pulley groove is defined at a position at which an end surface of the stepped portion of the second movable sheave abuts on an end surface of the stepped portion of the output shaft.

6. The belt-type continuously variable transmission for a vehicle of claim 1, wherein the primary pulley is disposed with the first groove width defining portion defining the maximum groove width of the first pulley groove, and wherein the secondary pulley is disposed with the second groove width defining portion defining the maximum groove width of the second pulley groove.

7. The belt-type continuously variable transmission for a vehicle of claim 1, wherein the first groove width defining portion prevents movement of the first movable sheave to a side opposite to the first fixed sheave in the axial direction when an end surface of the first movable sheave on a side opposite to the first fixed sheave in the axial direction abuts on a predetermined member.

8. The belt-type continuously variable transmission for a vehicle of claim 4, wherein the first groove width defining portion prevents movement of the first movable sheave to a side opposite to the first fixed sheave in the axial direction when an end surface of the first movable sheave on a side opposite to the first fixed sheave in the axial direction abuts on a predetermined member.

9. The belt-type continuously variable transmission for a vehicle of claim 6, wherein the first groove width defining portion prevents movement of the first movable sheave to a side opposite to the first fixed sheave in the axial direction when an end surface of the first movable sheave on a side opposite to the first fixed sheave in the axial direction abuts on a predetermined member.

10. The belt-type continuously variable transmission for a vehicle of claim 1, wherein the second groove width defining portion prevents movement of the second movable sheave to a side opposite to the second fixed sheave in the axial direction when an end surface of the second movable sheave on a side opposite to the second fixed sheave in the axial direction abuts on a predetermined member.

11. The belt-type continuously variable transmission for a vehicle of claim 5, wherein the second groove width defining portion prevents movement of the second movable sheave to a side opposite to the second fixed sheave in the axial direction when an end surface of the second movable sheave on a side opposite to the second fixed sheave in the axial direction abuts on a predetermined member.

12. The belt-type continuously variable transmission for a vehicle of claim 6, wherein the second groove width defining portion prevents movement of the second movable sheave to a side opposite to the second fixed sheave in the axial direction when an end surface of the second movable sheave on a side opposite to the second fixed sheave in the axial direction abuts on a predetermined member.

* * * * *